US010467059B2

(12) United States Patent
Derler et al.

(10) Patent No.: US 10,467,059 B2
(45) Date of Patent: Nov. 5, 2019

(54) DETERMINATION OF TIMING CONFIGURATIONS FOR PROGRAM DATAFLOW MODELS

(71) Applicant: NATIONAL INSTRUMENTS CORPORATION, Austin, TX (US)

(72) Inventors: Patricia Derler, Richmond, CA (US); Kaushik Ravindran, Berkeley, CA (US); Hugo A. Andrade, El Cerrito, CA (US); Ankita Prasad, San Francisco, CA (US); Arkadeb Ghosal, Vacaville, CA (US); Trung N. Tran, Fremont, CA (US); Rhishikesh Limaye, Berkeley, CA (US); Jacob Kornerup, Austin, TX (US)

(73) Assignee: National Instruments Corporation, Austin, TX (US)

( * ) Notice: Subject to any disclaimer, the term of this patent is extended or adjusted under 35 U.S.C. 154(b) by 206 days.

(21) Appl. No.: 15/471,792

(22) Filed: Mar. 28, 2017

(65) Prior Publication Data

US 2017/0286342 A1 Oct. 5, 2017

Related U.S. Application Data

(60) Provisional application No. 62/316,284, filed on Mar. 31, 2016.

(51) Int. Cl.
*G06F 9/50* (2006.01)
*G06F 13/366* (2006.01)
*G06F 13/40* (2006.01)
*G06F 13/36* (2006.01)

(52) U.S. Cl.
CPC .......... *G06F 9/5011* (2013.01); *G06F 13/366* (2013.01); *G06F 13/4068* (2013.01)

(58) Field of Classification Search
CPC ... G06F 13/366; G06F 13/4068; G06F 9/5011
USPC .................................................. 710/109
See application file for complete search history.

(56) References Cited

U.S. PATENT DOCUMENTS

| 5,867,716 | A * | 2/1999 | Morimoto | G06F 9/50 |
| | | | | 709/223 |
| 7,720,662 | B1 | 5/2010 | Aldrich | |
| 9,547,423 | B1 | 1/2017 | Moore | |
| 10,114,917 | B1 | 10/2018 | Venkataramani | |
| 2008/0162205 | A1 * | 7/2008 | Gross | G06Q 10/10 |
| | | | | 345/440 |

(Continued)

*Primary Examiner* — Christopher B Shin
(74) *Attorney, Agent, or Firm* — Meyertons Hood Kivlin Kowert and Goetzel PC; Jeffrey C. Hood; Luke S. Langsjoen

(57) ABSTRACT

A method for determining timing constraints in dataflow models is disclosed. The method includes receiving node information specifying a plurality of dataflow nodes, as well as coupling between various ones of the dataflow nodes. The method further comprising receiving timing information specifying timing constraints for at least some of the dataflow nodes. Based on the node information, the couplings between the nodes, and the timing information, a timeline dependency graph (TDG). The timeline dependency graph illustrates a timeline, mappings between nodes with side effects to firing times of those nodes on the timeline, and dependencies between nodes.

26 Claims, 22 Drawing Sheets

(56) References Cited

U.S. PATENT DOCUMENTS

| | | | |
|---|---|---|---|
| 2011/0078411 A1* | 3/2011 | MacLinovsky | G06Q 10/06 712/30 |
| 2012/0042256 A1* | 2/2012 | Jamjoom | G06F 9/5011 715/736 |
| 2013/0073972 A1* | 3/2013 | Yung | G06Q 50/01 715/738 |
| 2014/0089816 A1* | 3/2014 | DiPersia | G06F 3/0484 715/753 |
| 2016/0259832 A1* | 9/2016 | Shore | G06F 17/30592 |
| 2017/0019918 A1* | 1/2017 | Voigt | H04W 72/14 |
| 2017/0059341 A1* | 3/2017 | Vo | G01C 21/3446 |

* cited by examiner

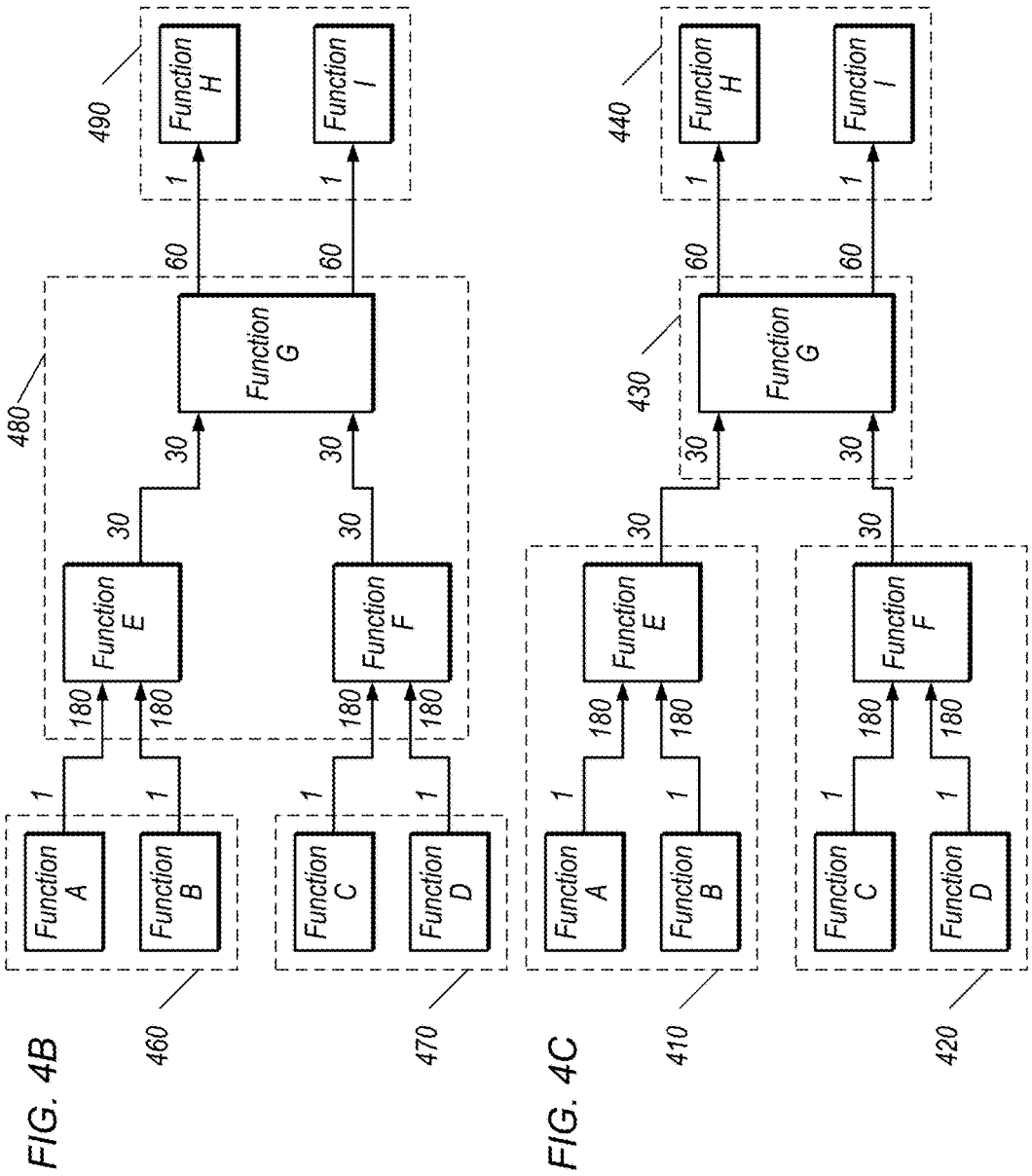

DETERMINATION OF TIMING CONFIGURATIONS FOR PROGRAM DATAFLOW MODELS

PRIORITY INFORMATION

This application claims priority to U.S. Provisional Patent Application No. 62/316,284, filed on Mar. 31, 2016, and is fully incorporated by reference herein.

BACKGROUND

Technical Field

This disclosure relates to programming, and more particularly, to determining timing constraints for data flow models.

Description of the Related Art

Applications for computer-based systems are typically growing in complexity and computing hardware is available in many forms. Some hardware elements perform certain tasks better than others. For example, field-programmable gate arrays (FPGAs) may be best suited for certain tasks while more traditional central processing units (CPUs) may be better for other tasks.

Many systems such as PCI-Extended (PXI) systems allow customizable connections of different hardware elements via a high-speed communication backplane. A heterogeneous PXI system may include, in some implementations multiple processors, FPGAs, fixed-function circuitry modules, and/or custom input/output (I/O) circuitry, and timing components. Furthermore, Time Sensitive Networks have enabled platforms to provide time synchronization and deterministic data transfer capabilities across large areas, in turn, enabling the creation of large deterministic distributed systems. The way in which a complex application is distributed across available processing elements may be key to successful system deployment. Given performance requirements and platform complexities, however, a good mapping may not be intuitive to find, and an exhaustive exploration may not be feasible even for modestly sized platform configurations.

Further, improvements may be desired in techniques for specifying constraints for applications such as timing constraints, relationships between program functions, bandwidth requirements, etc.

SUMMARY

A method for determining timing constraints in dataflow models is disclosed. In one embodiment, a method includes receiving node information specifying a plurality of dataflow nodes, as well as coupling between various ones of the dataflow nodes. The method further comprising receiving timing information specifying timing constraints for at least some of the dataflow nodes. Based on the node information, the couplings between the nodes, and the timing information, a timeline dependency graph (TDG). The timeline dependency graph illustrates a timeline, mappings between nodes with side effects to firing times of those nodes on the timeline, and dependencies between nodes.

The node information may specify consumption and production information for multiple ones of the plurality of dataflow nodes. The dataflow nodes may be implemented in a multi-rate data flow (MRD) program. A node represents a function in the program that consumes data from inputs and produces data on outputs. The function may begin execution as soon as sufficient data inputs are present. The timing information for a given node may the time at which the node should execute. A side effect may be defined as an interaction with the physical environment via I/O, and may sometimes be referred to as I/O side effect. In some embodiments, timing constraints can be applied to any node in the data flow model. In other embodiments, timing constraints may be applied only nodes associated with side effects.

A non-transitory computer readable medium storing instructions that, when executed by a processor, carry out an embodiment of the methodology discussed herein is also contemplated. Similarly, the present disclosure contemplated a computer system that carries out embodiments of the methodology described herein.

BRIEF DESCRIPTION OF THE DRAWINGS

The following detailed description makes reference to the accompanying drawings, which are now briefly described.

FIG. 4B is a diagram illustrating a multi-rate data flow representation of one embodiment of a software program mapped to another hardware configuration.

FIG. 4C is a diagram illustrating a multi-rate data flow representation of one embodiment of a software program mapped to a third hardware configuration

Figure 1:
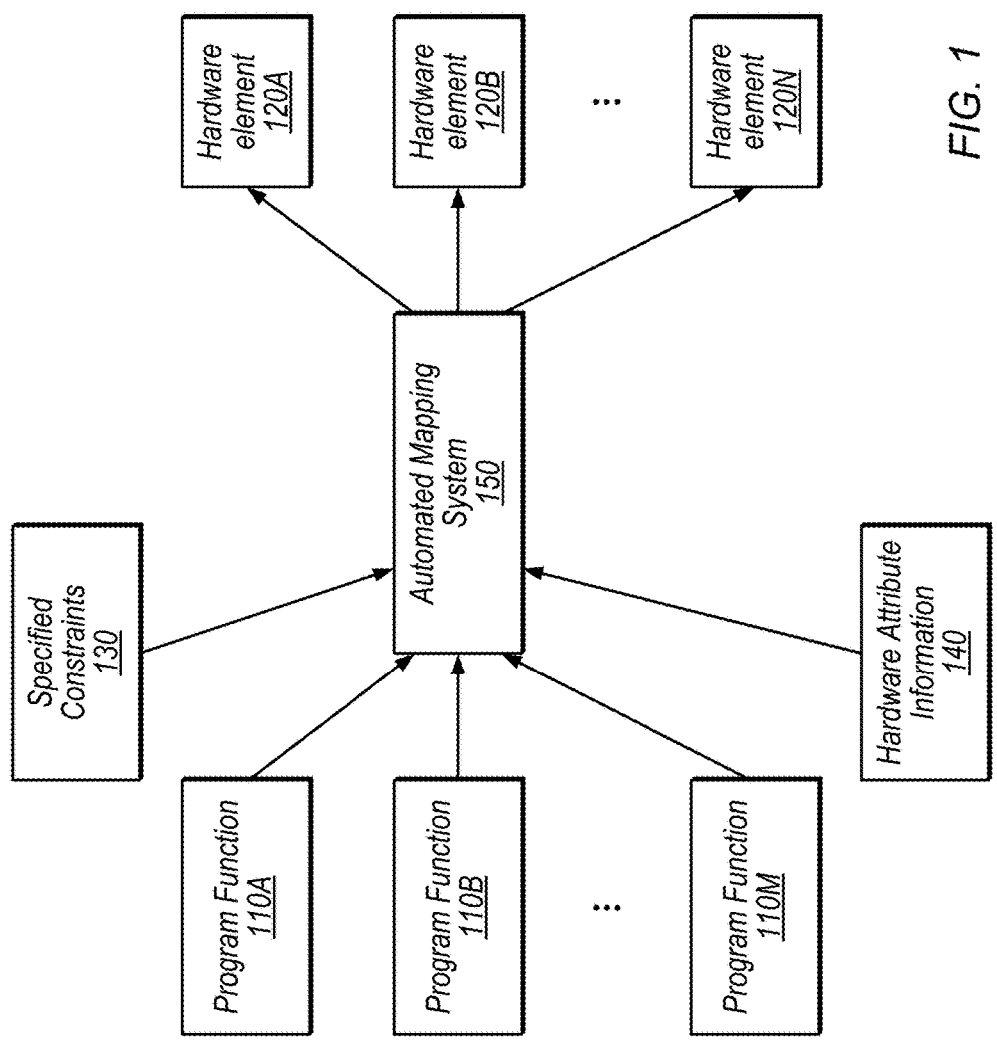
FIG. 1 is an exemplary system having an automated mapping system according to one embodiment.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Overview of Framework for Deploying Application Function on Distributed Heterogeneous Platforms FIG. 1 shows an example system that includes an automated mapping system 150, according to some embodiments. In the illustrated embodiment, the automated mapping system 150 receives specified program functions 110A-110M, specified constraints 130, and hardware attribute information 140. Based on this information, automated mapping system 150 maps the program functions to hardware elements 120A-120N. The automated mapping system 150 may be implemented as a software program that performs the mapping function automatically, i.e., without manual user input required to specify the mapping.

Program functions 110 may be specified using an application model that may include a library of building blocks. The program functions may be automatically specified using one or more instruction set architecture supported by the application model.

Specified constraints 130 may include, without limitation: timing constraints, cost constraints, quality-of-result constraints, relationship between functions, etc. These constraints may be specified by the user and used to both automatically select hardware elements and automatically determine a mapping of program functions to hardware elements. In some embodiments, hardware elements are selected from a set of available hardware to suggest the mapping while in other embodiments a fixed set of hardware elements (e.g., that have already been purchased) is used for the mapping.

Hardware attribute information 140 may specify, without limitation: bandwidth constraints, throughput constraints, area constraints, number of slices, clock frequency, availability of parallel processing capability, etc.

Hardware elements 120 may include programmable hardware elements, general purpose processors, digital signal processors, fixed function circuitry, communications hardware, etc. Hardware elements 120 may vary among a given type of element. For example, hardware elements 120 may include multiple different FPGAs with different capabilities.

In some embodiments, an "out of many one" (OOMO) framework may simplify deployment of large and complex domain specific software applications on to a hardware platform of heterogeneous targets. As applications grow bigger and more complex, optimizing variables (or improving variables) such as cost, power, and/or performance typically requires domain expertise and specialized knowledge of not only the software that the application is written in, but the hardware platform on which the application is deployed. Selecting the right combination of hardware targets, i.e. choosing between FPGAs, sequential processors, parallel processors, etc. is not an easy task. Many programmers do not have such specialization across the spectrum of hardware and software. Further, improving implementation details may impact the productivity of domain experts, who could spend their time better focusing on algorithmic challenges.

Figure 2A:
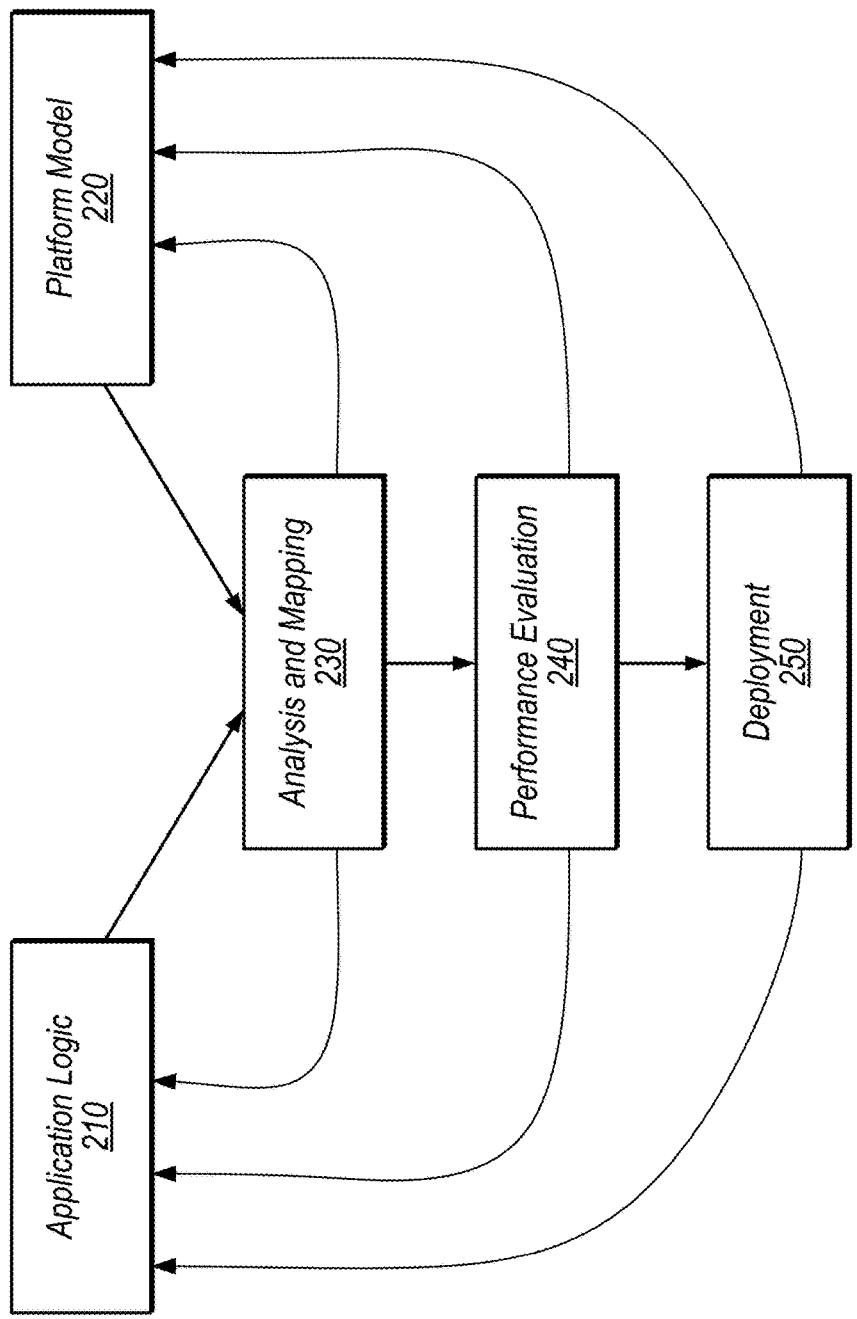
FIGS. 2A-2C illustrate various aspects of an "Out of Many, One" context for various embodiments.

FIG. 2A shows an example Y-structure flow diagram in the OOMO context. In some embodiments, the OOMO framework allows an automated system level synthesis and exploration to automatically deploy complex applications on distributed heterogeneous platforms. The framework may include a well-defined and analyzable application model and a library of platform building blocks with relevant performance characteristics. This may be included in platform model 220. Application logic 210 may include program functions specified by a developer, which may include various library functions. The analysis and mapping step 230 may employ a toolbox of strategies, e.g., trading off efficiency of computation and quality of results, to automatically determine an organization of the application components on the platform. Subsequent performance evaluation 240 feeds back revisions to the application model and platform configuration. Eventually, the automatically determined mapping may be used to automatically deploy the application logic 210 to computing hardware. This automatic operation may enable an application domain expert to quickly explore the space of system configurations and discover suitable deployments without getting bogged down with lower level implementation details.

Example domains of applications that can benefit from the OOMO technology are radio frequency (RF), communications, vision, and distributed control applications. These applications are typically deployed on heterogeneous hardware platforms that are composed of macro and micro instruction processors, FPGAs, real-time processors, and fixed function circuitry. These processing elements are typically interconnected in a distributed network along with memories and I/O.

Components of the OOMO framework may include:
1. Application model specification
2. Platform description
3. Performance and resource characterization
4. Constraints specification
5. Analysis and mapping
6. Feedback and visualization
7. Implementation and deployment In some embodiments the application model is specified in an intuitive graphical environment. The environment may provide language features customized for an application domain. Underlying the application model is a well-defined and analyzable model of computation, where the model of computation may be procedural, data flow, etc. The user can describe functions and their interactions and further can contemplate functional execution characteristics of his application at this level. Additionally, the user can integrate pre-existing functional blocks and IP into his application. The language encapsulates the formal properties of the application model while presenting an abstraction that enables a domain expert to easily specify an application. The language captures the tasks, data dependencies, memory and I/O interactions, and relevant performance and resource constraints in the application. In addition, it provides features to explicitly specify large-scale task, data, and pipeline level concurrency that is representative of modern high performance distributed applications.

The platform description captures the processing and networking elements that can be composed to form a suitable platform for the application. The user can specify a complete platform configuration based on cost and performance requirements. Alternatively, in some embodiments the OOMO framework can suggest a platform that is best suited for the application after analyzing the application and its requirements and constraints. The platform may include both computation and communication elements. In some embodiments, some or all platform elements are pre-characterized and their characterized properties are available to the analysis components.

The OOMO approach may allow separation of concerns between the application and platform specification. One goal is to enable the user to design application algorithms without any assumption about platform characteristics. The performance and resource characterization step then determines the execution properties of the tasks and communications in the application on the processing and networking elements in the platform description. For example, execution time and memory footprint are representative characteristics for a task on an instruction set processor. The analysis and mapping component may subsequently use this characterization to select suitable processing components and network topologies, and determine a viable distribution of the application components on the platform.

Given an application, platform, and performance and resource characteristics, there are still many possible ways in which the application can be mapped and deployed. Constraint specification allows the user to specify constraints like throughput, latency, power, cost, or any other requirement that should be satisfied or optimized in a successful deployment. These constraints guide analysis and mapping to explore the design space and determine a system configuration that satisfies all requirements. Additional implementation constraints include affinities or bindings between parts of the application or I/O and specific hardware elements, groupings of specific application tasks, and explicit precedences or exclusions between tasks.

The analysis and mapping step 230 may include a check that an application model is valid with respect to the underlying model of computation. The analysis and mapping step 230 may then determine a mapping of the application onto a platform selected by the user or from a platform configuration assembled from the processing and networking elements in the platform description. In some embodiments, the mapping is displayed visually; making it clear to the user as to which parts of their application goes on which hardware component. The mapping respects the constraints such as throughput, latency, cost, and other implementation constraints. Thus, in one embodiment, the result of the mapping is an allocation of application tasks to processing elements and communications to network links so that system deployment is viable.

In some embodiments, once a mapping is created the framework provides a simulation and visualization environment that the user can use to check the correctness of his application. From development to deployment, simulation may be available at different points to help the user check the functional and timing correctness of their application. The feedback may be important in enabling the user to explore the design space by revising the application model, platform description, and constraints. Additionally, this may allow the user to verify that the generated mapping functions correctly and meets performance goals and specifications.

Figure 2B:
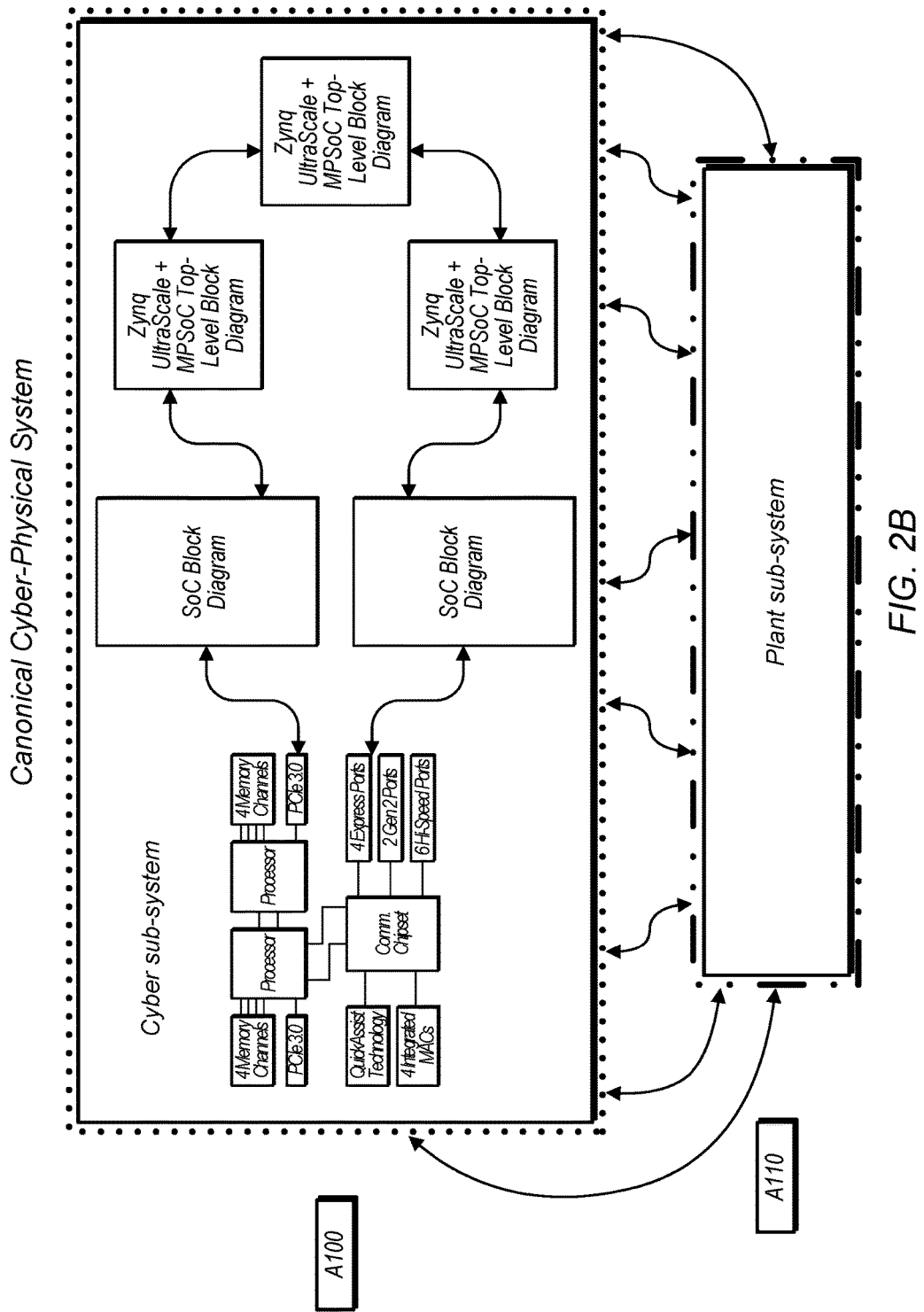

For purposes of system-level simulation we consider the canonical cyber-physical system (CPS) shown in FIG. 2B, where the cyber-part A100 is composed of a network of heterogeneous computing elements on which an application program executes, and that is connected via input/output ports to a physical plant A110, which itself can be distributed in nature.

Figure 2C:
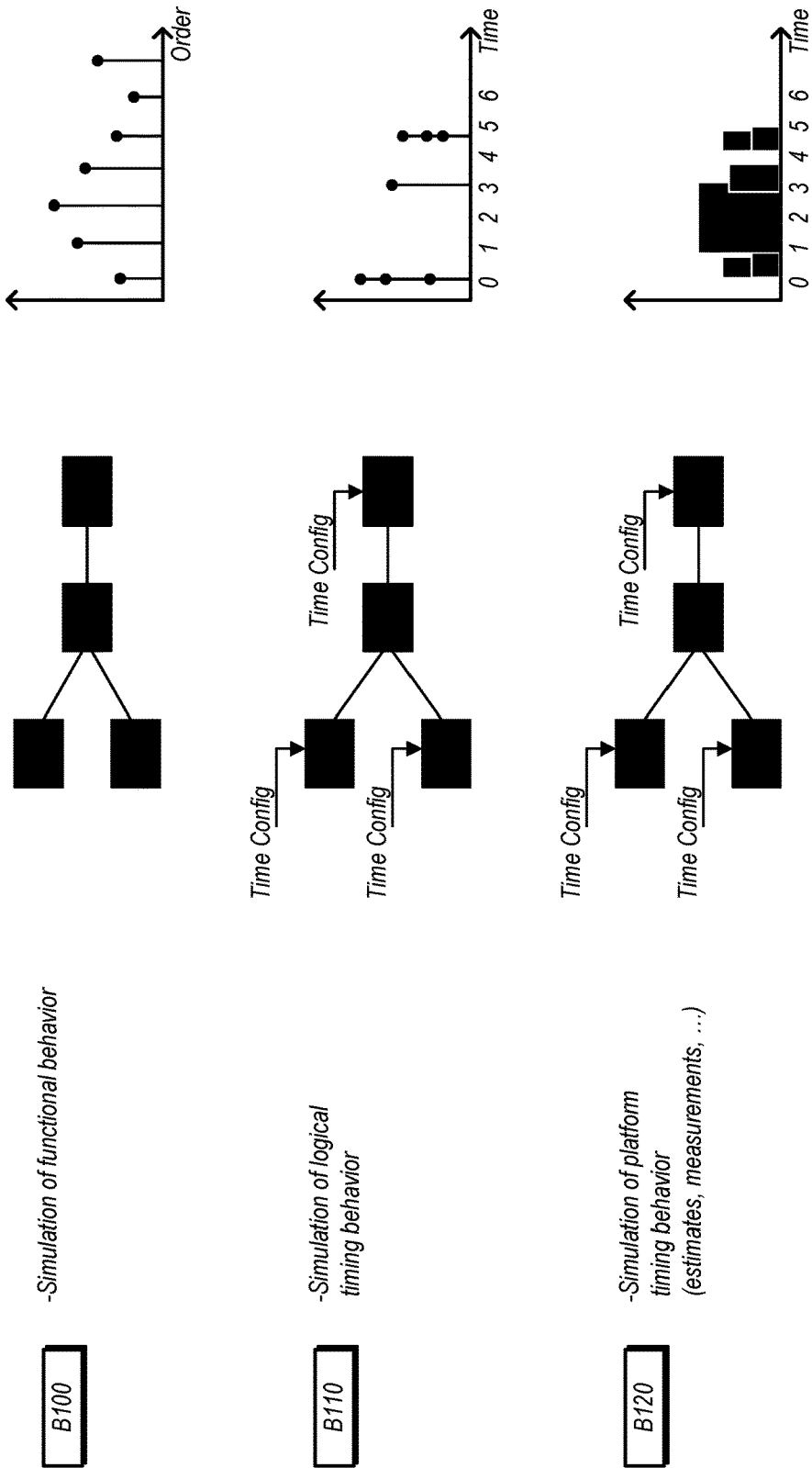

In the more general sense, a simulation of the CPS can be viewed at three levels. A first level, as shown in B100 of FIG. 2C, considers only the application's functional behavior, independent of the cyber part implementation. The IO only provides a connection mechanism to identify what parts of the application are connected to what logical parts of the plant. No timing information can be extracted from this level of simulation, and only possible order of operations may be inferred.

A second level of simulation, as shown in B110, is one where the application IO nodes have specific timing specification configurations. Even though the application is not running on a specific cyber part with corresponding execution time, the system can extract timing information from the simulation because the IO interaction is assumed to take place at the specified times. As in the first level, the computation is taken to happen in zero time. From this simulation, the user is only able to extract information about the application interacting with the plant at specified times, but the user is not able to understand if the application would be able to run on a given cyber part at the speed necessary to satisfy the specified IO rate.

A third level of simulation is shown in B120, where the application is considered mapped to a cyber part, and can be simulated based on known execution models for that cyber part. With this level the simulation can produce precise timing not only at the application logical timing level, but actually would help identify if the application can run at speed to satisfy the IO rate requirements.

For the second and third levels of simulation, the model of the plant can be simulated in a timed manner as well, and is typically described using continuous time semantics, which provide very detailed accurate behavior of the plant. The simulation of the cyber part and plant may be done separately, but in a coupled manner, i.e. co-simulation.

Finally, when the user is satisfied with the platform configuration and mapping generated by the framework and has checked the correctness of these generated results using simulation, the framework may provide tools to deploy the application on to the platform. The deployment step may synthesize the software and hardware components for the distributed heterogeneous targets in the platform, the communication links between these targets, and any initializations needed to successfully run the application.

Exemplary Hardware Systems

Figure 3A:
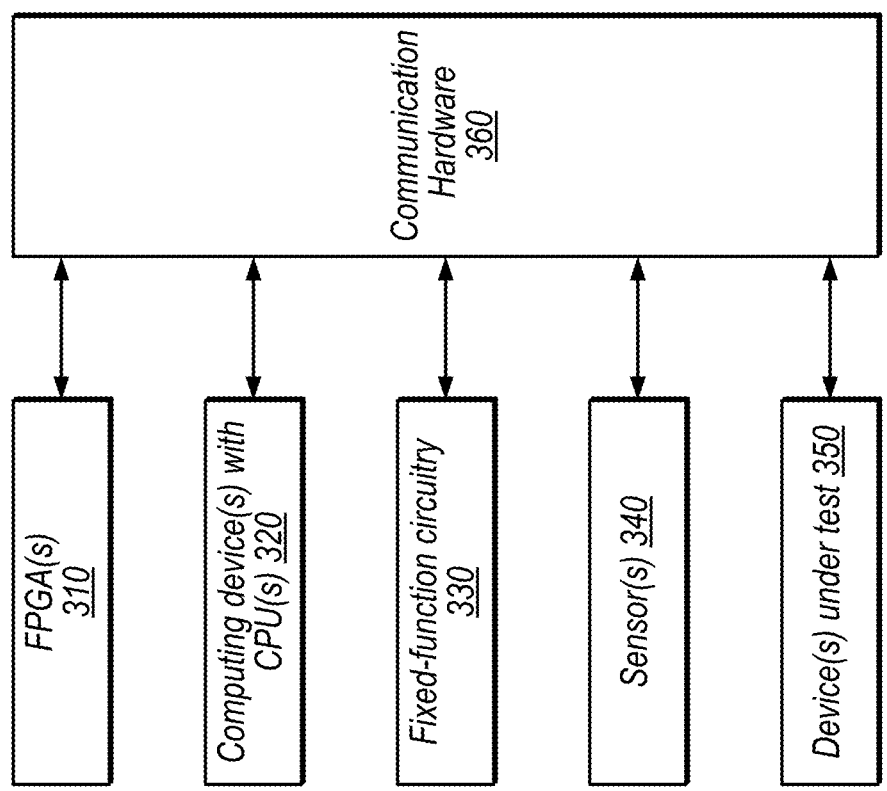
FIG. 3A is a block diagram illustrating an exemplary embodiment of a target system.

FIG. 3A is a block diagram illustrating an exemplary target system. A target system may include only a portion of the illustrated elements and/or may include other elements not shown, in various embodiments. Speaking generally, the diagrams included herein (including the appendices) are shown for exemplary purposes and are not intended to limit the scope of the present disclosure.

In the illustrated embodiment, the target system includes one or more field-programmable gate arrays (FPGAs) 310 (referred to generally as programmable hardware elements), one or more computing devices with central processing units (CPUs) 320, fixed function circuitry 330 (e.g., application-specific integrated circuits (ASICS)), sensor(s) 340, and device(s) under test 350. In the illustrated embodiment, the various different types of hardware processing elements are coupled via communication hardware 360. Communication hardware 360 may include an of various appropriate communication channels using various different protocols. Communications hardware may include hierarchical switching arrangements, peer-to-peer communications, buses, multiplexers, fabrics, etc. Each of the different types of hardware may further include heterogeneous elements, e.g., FPGA(s) 310 may include multiple different types of FPGAs with different capabilities. In other embodiments any of various elements may be coupled to I/O nodes of the system, and communications with these elements may be referred to as "side-effects."

Figure 3B:
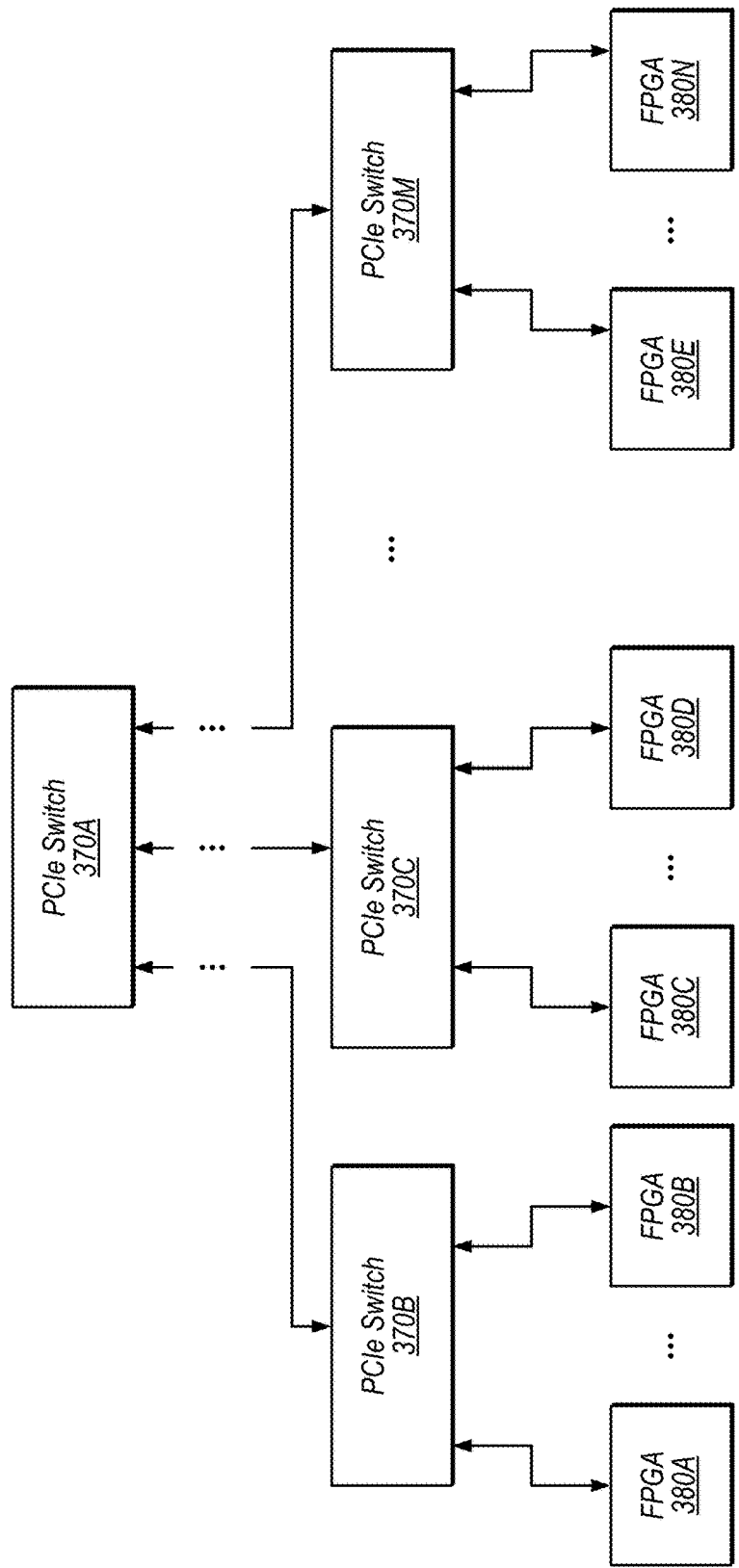
FIG. 3B is a block diagram illustrating an embodiment of a system that includes multiple hierarchically-arranged Peripheral Component Interconnect Express (PCIe) switches and multiple field programmable gate arrays (FPGAs).

FIG. 3B is a block diagram illustrating a particular system that includes multiple hierarchically-arranged Peripheral Component Interconnect Express (PCIe) switches 370A-M and multiple FPGAs 380A-N. Attributes for the communications portion of this system may include bandwidth on each link and the number of separate channels that each link can support. FPGAs 380 may include multiple different types of FPGAs which may have different attributes such as number of slices, number of registers, available random access memory (RAM), etc. The illustrated system may have a particular bandwidth model for unidirectional and/or bidirectional traffic and bandwidth may be shared (linearly in some implementations) between competing streams. For exemplary purposes, consider a system with 838 MB/s bandwidth for unidirectional traffic and 761 MB/s bandwidth for bidirectional traffic (using 128-byte packets). The attributes discussed above may be taken into consideration when mapping program functions to the illustrated hardware.

Exemplary Mappings Based on Bandwidth and Area Constraints

Figure 4A:
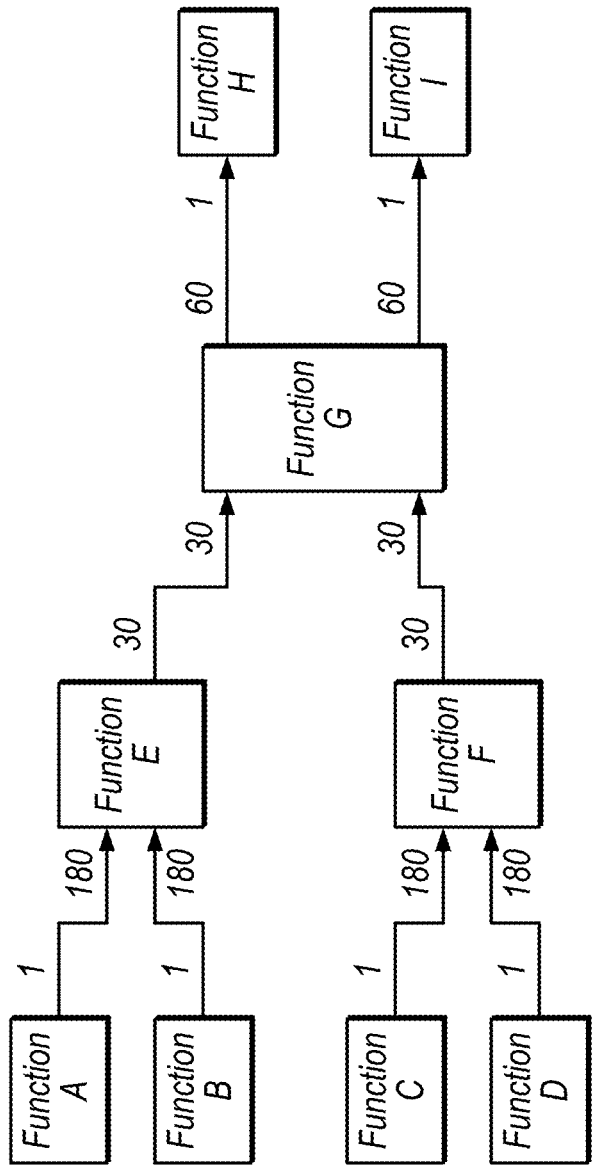
FIG. 4A is a diagram illustrating a multi-rate data flow representation of one embodiment of a software program having multiple program functions.

FIG. 4A shows a multi-rate data flow representation of a software program with program functions A-I. In the illustrated embodiment, the number to the right of each function indicates its production characteristics while the number to the left of each function indicates its consumption characteristics. For example, function E, in the illustrated embodiment, fires after it receives 180 units at each input and generates 30 units of output. This data flow program is "multi-rate" because the production and consumption values on a given link can be different.

The program shown in FIG. 4A may be mapped to hardware (e.g., the hardware shown in FIG. 3B) in various ways. Some of the mappings, however, may not be acceptable given hardware attributes. For example, FIG. 4B shows a mapping where functions A and B are mapped to the same hardware element 460, functions C and D are mapped to the same hardware element 470, functions E, F, and G are mapped to the same hardware element 480 and functions H and I are mapped to the same hardware element 490.

Now consider an exemplary situation where the hardware elements 460-490 are FPGAs of FIG. 3B and the functions A-D generate 750 MB/s of data. In the mapping of FIG. 4B, the communications between functions A-D and functions E-F require 3000 MB/s of P2P bandwidth, which may not be feasible using the switches of FIG. 3B.

In FIG. 4C, on the other hand, a different mapping is used. In this mapping, the communications between hardware elements 410, 420, and 430 require 250 MB/s of P2P bandwidth and the communications between hardware elements 430 and 440 require 500 MB/s of P2P bandwidth using the exemplary situation above, which may be achievable using the system of FIG. 3B. Thus, in some embodiments, an OOMO system is configured to determine multiple mappings and select a mapping that satisfies user constraints based on the attributes of available hardware resources. For example, an OOMO system may generate the mapping of FIG. 4C rather than the mapping of FIG. 4B for the exemplary situation described above.

Figure 5:
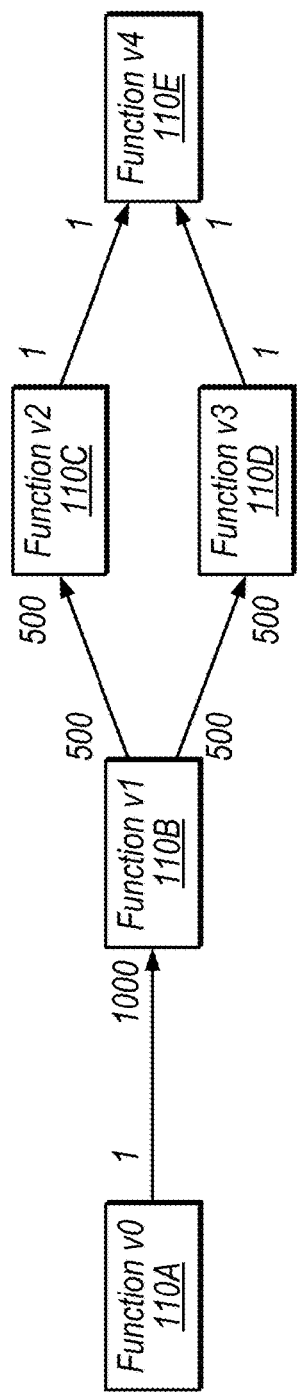
FIG. 5 is a block diagram illustrating one embodiment of an exemplary data flow program.
Figure 6:
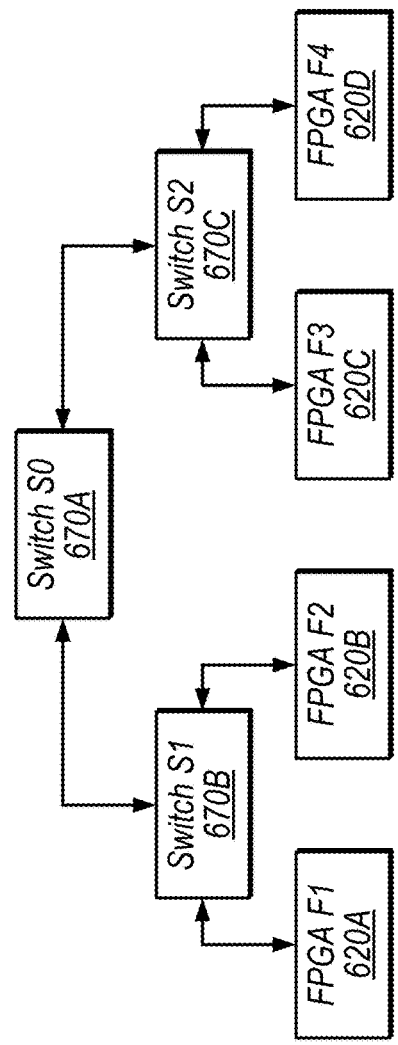
FIG. 6 is a block diagram illustrating another embodiment of a system that includes multiple hierarchically-arranged Peripheral Component Interconnect Express (PCIe) switches and multiple field programmable gate arrays (FPGAs).

FIG. 5 is a block diagram illustrating another exemplary data flow program while FIG. 6 illustrates a particular implementation of FIG. 3B. The following equations provide examples for how to determine mappings of functions to hardware to satisfy bandwidth and area attributes. In various embodiments, similar techniques may be used for various other attributes.

In the examples below, it is assumed that the throughput out of function v0 is ¼ samples a cycle. This means that the output channels from v1 are each at ⅛ samples per cycle and that the throughput on the output of v2 and v3 is 1/4000 samples per cycle. Given particular production and consumption counts and required throughput, an OOMO system may be configured to determine how to partition the functions so that the combined throughputs of all the channels going through each link on the hardware is within the available bandwidth.

For example, for the link between FPGA F1 and switch S1, the following equation describes how the max bandwidth on this link for a given mapping must be less than or equal to the available bandwidth k samples per cycle. Each link is similarly evaluated below.

$((v0 \text{ on } F1, v1 \text{ not on } F1)?¼:0)+$ $((v1 \text{ on } F1, v2 \text{ not on } F1)?⅛:0)+$ $((v1 \text{ on } F1, v3 \text{ not on } F1)?⅛:0)+$ $((v2 \text{ on } F1, v4 \text{ not on } F1)?1/4000:0)+$ $((v3 \text{ on } F1, v4 \text{ not on } F1)?1/4000:0)<=k$ Enforce bandwidth constraint on link (S1-F1)

$((v0 \text{ not on } F1, v1 \text{ on } F1)?¼:0)+$ $((v1 \text{ not on } F1, v2 \text{ on } F1)?⅛:0)+$ $((v1 \text{ not on } F1, v3 \text{ on } F1)?⅛:0)+$ $((v2 \text{ not on } F1, v4 \text{ on } F1)?1/4000:0)+$ $((v3 \text{ not on } F1, v4 \text{ on } F1)?1/4000:0)<=k$ Enforce bandwidth constraint on link (F2-S1)

$((v0 \text{ on } F2, v1 \text{ not on } F2)?¼:0)+$ $((v1 \text{ on } F2, v2 \text{ not on } F2)?⅛:0)+$ $((v1 \text{ on } F2, v3 \text{ not on } F2)?⅛:0)+$ $((v2 \text{ on } F2, v4 \text{ not on } F2)?1/4000:0)+$ $((v3 \text{ on } F2, v4 \text{ not on } F2)?1/4000:0)<=k$ Enforce bandwidth constraint on link (S1-F2)

$((v0 \text{ not on } F2, v1 \text{ on } F2)?¼:0)+$ $((v1 \text{ not on } F2, v2 \text{ on } F2)?⅛:0)+$ $((v1 \text{ not on } F2, v3 \text{ on } F2)?⅛:0)+$ $((v2 \text{ not on } F2, v4 \text{ on } F2)?1/4000:0)+$ $((v3 \text{ not on } F2, v4 \text{ on } F2)?1/4000:0)<=k$ Enforce bandwidth constraint on link (F4-S2)

$((v0 \text{ on } F4, v1 \text{ not on } F4)?¼:0)+$ $((v1 \text{ on } F4, v2 \text{ not on } F4)?⅛:0)+$ $((v1 \text{ on } F4, v3 \text{ not on } F4)?⅛:0)+$ $((v2 \text{ on } F4, v4 \text{ not on } F4)?1/4000:0)+$ $((v3 \text{ on } F4, v4 \text{ not on } F4)?1/4000:0)<=k$ Enforce bandwidth constraint on link (S2-F4)

$((v0 \text{ not on } F4, v1 \text{ on } F4)?¼:0)+$ $((v1 \text{ not on } F4, v2 \text{ on } F4)?⅛:0)+$ $((v1 \text{ not on } F4, v3 \text{ on } F4)?⅛:0)+$ $((v2 \text{ not on } F4, v4 \text{ on } F4)?1/4000:0)+$ $((v3 \text{ not on } F4, v4 \text{ on } F4)?1/4000:0)<=k$ Enforce bandwidth constraint on link (F3-S2)

$((v0 \text{ on } F3, v1 \text{ not on } F3)?¼:0)+$ $((v1 \text{ on } F3, v2 \text{ not on } F3)?⅛:0)+$ $((v1 \text{ on } F3, v3 \text{ not on } F3)?⅛:0)+$ $((v2 \text{ on } F3, v4 \text{ not on } F3)?1/4000:0)+$ $((v3 \text{ on } F3, v4 \text{ not on } F3)?1/4000:0)<=k$ Enforce bandwidth constraint on link (S2-F3)

$((v0 \text{ not on } F3, v1 \text{ on } F3)?¼:0)+$ $((v1 \text{ not on } F3, v2 \text{ on } F3)?⅛:0)+$ $((v1 \text{ not on } F3, v3 \text{ on } F3)?⅛:0)+$ $((v2 \text{ not on } F3, v4 \text{ on } F3)?1/4000:0)+$ $((v3 \text{ not on } F3, v4 \text{ on } F3)?1/4000:0)<=k$ Similarly enforce bandwidth constraints on the links between switches:

Enforce bandwidth constraint on link (S1-S0)

$((v0 \text{ on } F1 \text{ or } F2, v1 \text{ not on } F1 \text{ and } F2)?¼:0)+$ $((v1 \text{ on } F1 \text{ or } F2, v2 \text{ not on } F1 \text{ and } F2)?⅛:0)+$ $((v1 \text{ on } F1 \text{ or } F2, v3 \text{ not on } F1 \text{ and } F2)?⅛:0)+$ $((v2 \text{ on } F1 \text{ or } F2, v4 \text{ not on } F1 \text{ and } F2)?1/4000:0)+$ $((v3 \text{ on } F1 \text{ or } F2, v4 \text{ not on } F1 \text{ and } F2)?1/4000:0)<=k$ Enforce bandwidth constraint on link (S0-S1)

$((v0 \text{ on } F3 \text{ or } F4, v1 \text{ not on } F3 \text{ and } F4)?¼:0)+$ $((v1 \text{ on } F3 \text{ or } F4, v2 \text{ not on } F3 \text{ and } F4)?⅛:0)+$ $((v1 \text{ on } F3 \text{ or } F4, v3 \text{ not on } F3 \text{ and } F4)?⅛:0)+$ $((v2 \text{ on } F3 \text{ or } F4, v4 \text{ not on } F3 \text{ and } F4)?1/4000:0)+$ $((v3 \text{ on } F3 \text{ or } F4, v4 \text{ not on } F3 \text{ and } F4)?1/4000:0)<=k$ Enforce bandwidth constraint on link (S0-S2)

$((v0 \text{ on } F1 \text{ or } F2, v1 \text{ not on } F1 \text{ and } F2)?¼:0)+$ $((v1 \text{ on } F1 \text{ or } F2, v2 \text{ not on } F1 \text{ and } F2)?⅛:0)+$ $((v1 \text{ on } F1 \text{ or } F2, v3 \text{ not on } F1 \text{ and } F2)?⅛:0)+$ $((v2 \text{ on } F1 \text{ or } F2, v4 \text{ not on } F1 \text{ and } F2)?1/4000:0)+$ $((v3 \text{ on } F1 \text{ or } F2, v4 \text{ not on } F1 \text{ and } F2)?1/4000:0)<=k$ Enforce bandwidth constraint on link (S2-S0)

$$((v0 \text{ on } F3 \text{ or } F4, v1 \text{ not on } F3 \text{ and } F4)?¼:0)+$$

$$((v1 \text{ on } F3 \text{ or } F4, v2 \text{ not on } F3 \text{ and } F4)?⅛:0)+$$

$$((v1 \text{ on } F3 \text{ or } F4, v3 \text{ not on } F3 \text{ and } F4)?⅛:0)+$$

$$((v2 \text{ on } F3 \text{ or } F4, v4 \text{ not on } F3 \text{ and } F4)?1/4000:0)+$$

$$((v3 \text{ on } F3 \text{ or } F4, v4 \text{ not on } F3 \text{ and } F4)?1/4000:0)<=k$$

An OOMO system may perform similar calculations for each proposed mapping to determine whether the mappings are feasible.

Similarly, for a given mapping, an OOMO system may enforce area constraints. For example, consider a situation in with v0 requires 100 units of area (e.g., slices, gates, etc.), v1 requires 1000 units, v2 requires 2000 units, v3 requires 1500 units, and v4 requires 100 units. In this example, to determine whether a particular mapping falls within area constraints for F1 (which has 3000 units of area), an OOMO system may use the following equation.

$$((v0 \text{ on } F1)?100:0+$$

$$(v1 \text{ on } F1)?1000:0+$$

$$(v2 \text{ on } F1)?2000:0+$$

$$(v3 \text{ on } F1)?1500:0+$$

$$(v4 \text{ on } F1)?100:0))<=3000$$

For example, in a mapping in which v1 and v2 are both mapped to F1, this may use the entire area of F1, meaning that other functions cannot be mapped to F1 in such a mapping.

In the example above, it is assumed the data production and consumption counts of program functions are known, which helps determine relative throughputs of all channels between program functions in the application. Nevertheless, the analysis to determine feasible mappings can be extended to general multi-rate dataflow programs where data production and consumption counts of some or all program functions are unknown. In this situation, the relative throughputs of channels can be determined by simulating the program functions based on a representative input test bench, possibly provided by the user. The data rates on all channels can be monitored during the simulated execution. This method provides an estimate of relative throughputs of channels, which can be subsequently used in the analysis to determine feasible mappings.

Wireless Transmitter Example

Figure 7:
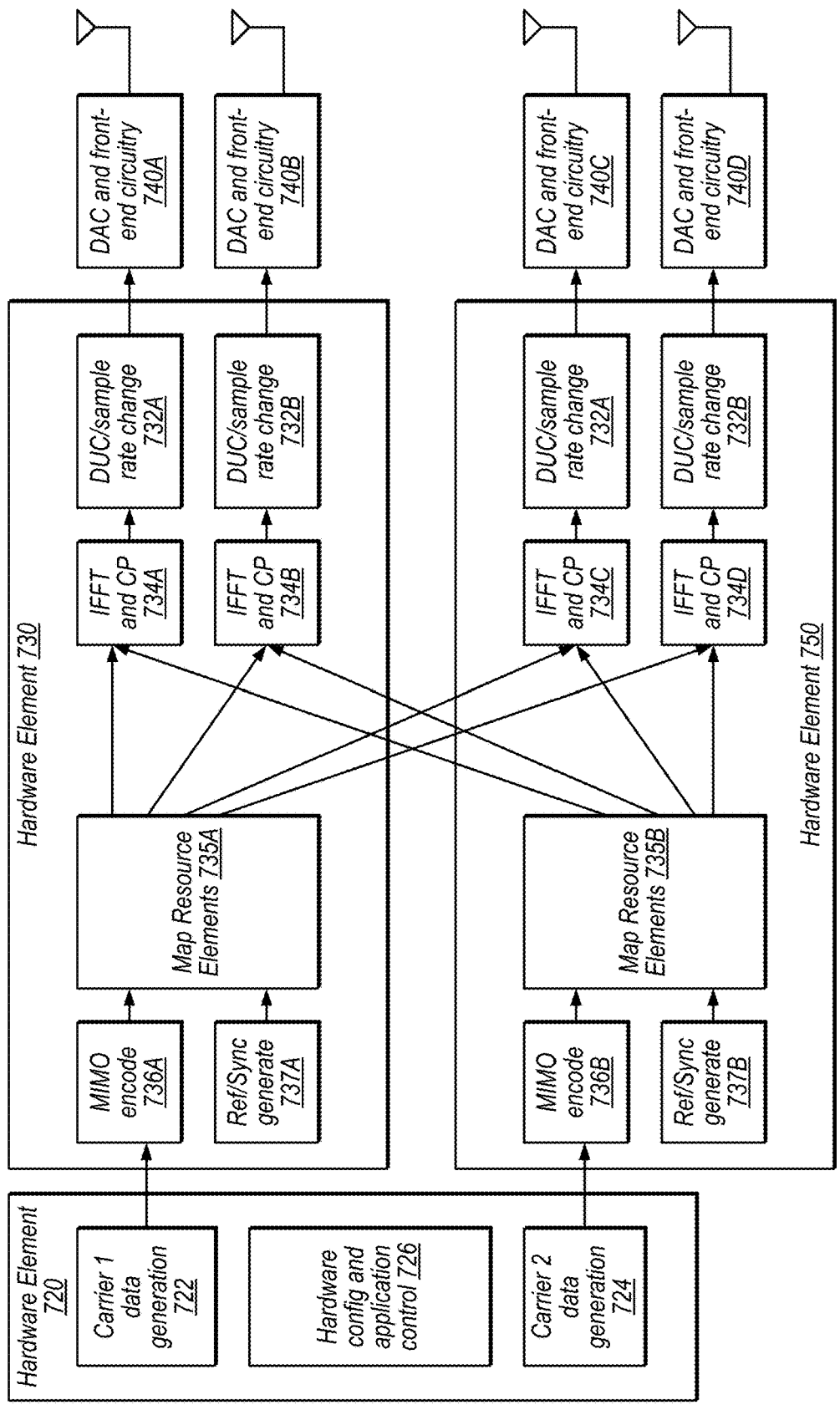
FIG. 7 is a block diagram illustrating an exemplary mapping of functionality for one embodiment of a multi-input multi-output (MIMO) wireless transmitter to particular hardware elements.

FIG. 7 is a block diagram illustrating an exemplary mapping of functionality for a multi-input multi-output (MIMO) wireless transmitter to particular hardware elements. The wireless transmitter may be comprised in a user equipment (UE) device. In the illustrated embodiment, hardware element 720 includes one or more traditional CPUs and is configured to generate carrier data, configure hardware, and perform application control. In the illustrated embodiment, hardware element 730 and 750 are programmable hardware elements (FPGAs) that are configured to perform MIMO encoding, generate reference and synchronization signals, map resource elements, perform inverse fast Fourier transforms (IFFTs) and perform upconversion. In the illustrated embodiment, DAC and front-end hardware elements 740A-D are fixed function circuitry coupled to antennas for transmission. In some embodiments, an OOMO system is configured to generate the illustrated mapping.

In some embodiments, hardware element 720 includes graphical data flow program code (e.g., LabVIEW code) running on a CPU machine such as a PXIe-8133 device. In some embodiments, hardware elements 730 and 750 are PXIe-7965 FlexRIO devices. In some embodiments, circuitry 740 includes 5791 DACs and PXIe-5611 upconverters. In other embodiments, any of various particular hardware elements may be implemented. In some embodiments, a given programmable hardware element (e.g., FPGA) may be programmed with IP from multiple different entities.

The illustrated mapping may be based on bandwidth constraints between elements, area constraints, timing constraints, groupings or exclusions of program functions, etc. Based on these constraints and attributes of available hardware, the illustrated mapping may be one mapping that achieves desired functionality. If there are multiple possible mappings, an OOMO system may be configured to select a mapping to maximize a particular desired characteristic such as hardware cost, power consumption, number of hardware elements, etc.

In addition to partitioning and mapping, an OOMO system may also perform scheduling of program functions given time specifications and latency constraints. This may be particularly relevant for real time control applications with strict timing requirements.

In some embodiments, an OOMO system may select appropriate IP for deployment on a particular hardware target from among IP from multiple different vendors, for example.

In some embodiments, OOMO systems are configured to determine mappings for a provided set of hardware. In some embodiments, OOMO also provides guided feedback during design time and in turn enables design space exploration. For example, an OOMO system may explore and suggest platform configurations given an application model, without user specification of particular hardware targets.

In various embodiments, the disclosed mapping techniques may be performed automatically by a computing device. In various embodiments, user input may be utilized at various iterations of the mapping process, e.g., to refine constraints or specifications, discard certain proposed mappings, select particular hardware etc. However, the mapping itself may be carried out by a computer system without additional user input upon defining the various constraints, specification, functions, and so forth.

Figure 8:
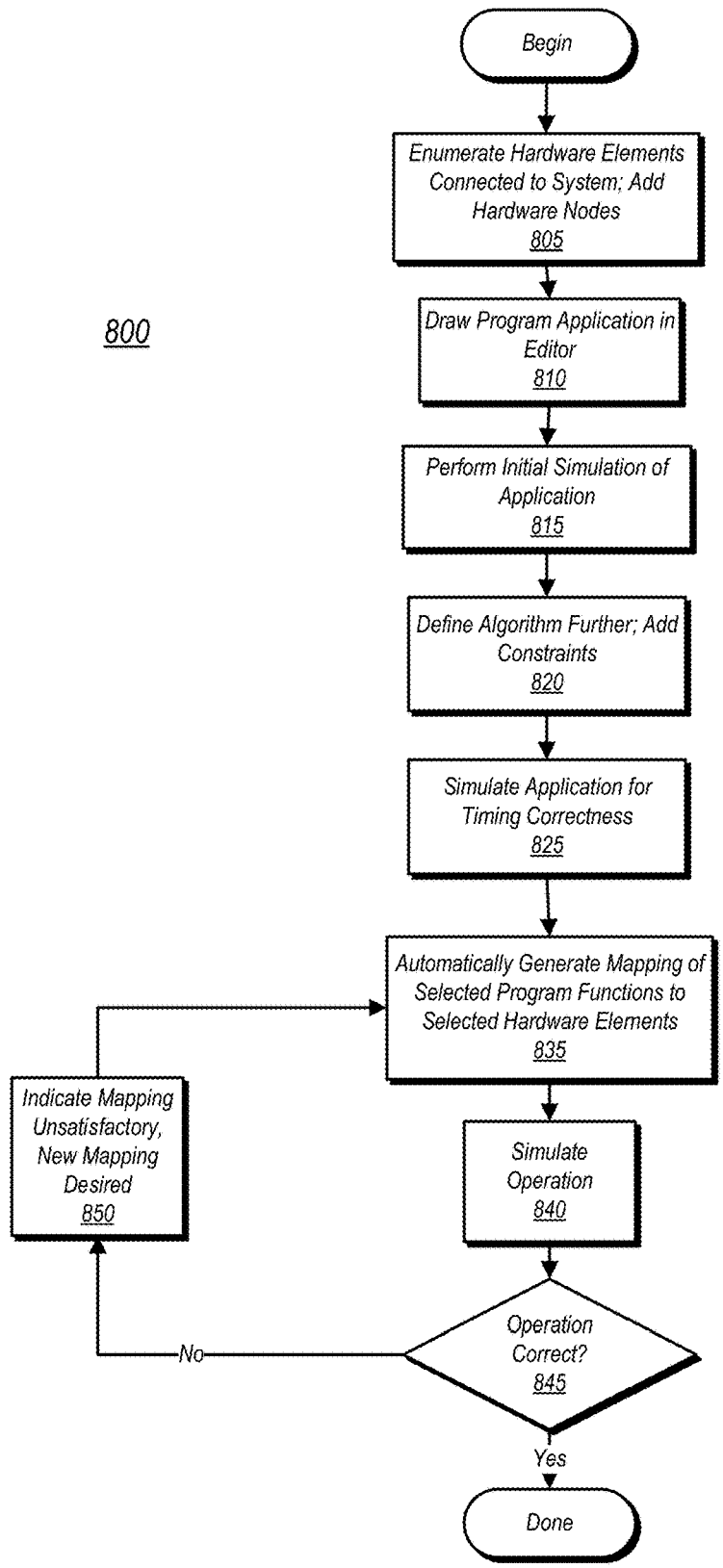
FIG. 8 is a flow diagram illustrating one embodiment of a method for automatically mapping program functions to distributed heterogeneous hardware platforms.

Turning now to FIG. 8, a flow diagram illustrating one embodiment of a method for automatically mapping program functions to distributed heterogeneous hardware platforms is shown. Method 800 as shown here may be performed for the various exemplary program and hardware embodiment discussed herein, as well as for numerous other embodiments of the same. The embodiment of the methodology carried out in FIG. 8 may be performed by a wide variety of computer systems. It is further noted that the embodiment of method 800 shown herein is but one possible embodiment of a method for automatically mapping program functions to hardware elements, and other embodiments are possible and contemplated. Finally, it is noted the order of the steps of the illustrated embodiment of method 800 is exemplary, and that the various method steps may be performed in a different order in other embodiments.

Method 800 begins with the enumerating of hardware elements connected to a system and the adding of hardware nodes (block 805). The hardware nodes in this example are computation as well as communication elements. The method allows specification of a complete platform configuration based on cost and performance requirements. Alternatively, the method can suggest a platform that is best suited for the application after analyzing the application and its requirements and constraints. The method further includes drawing a program application in an editor (block 810). Programming may be performed using a graphical program language (e.g., LabVIEW), and thus drawing of the application may include laying out graphical representations of various program functions in the editor. Additionally, the language can support integration of pre-existing functional blocks and IP into the application. The language captures the tasks, data dependencies, memory and I/O interactions, and relevant performance and resource constraints in the application. Upon completion of the initial programming, simulation of the resulting application is performed (block 815). During and after the performing of the simulation, the effectiveness of the program in carrying out its intended functions may be evaluated. This helps determine performance and resource characteristics of the application, such as the execution properties of the tasks and communications in the application on the processing and networking elements in the platform. This in turn may lead to further defining the program algorithm and adding constraints (block 820). The constraints may include various requirements for proper execution of the program, including timing, throughput, latency, power, cost, or any other requirement that must be satisfied or optimized in a successful deployment. These constraints guide analysis and mapping to explore the design space and determine a system configuration that satisfies all requirements. The determining of various program restraints, including timing constraints, is discussed in further detail below. The application may again be simulated, including simulation for timing correctness (block 825). Although the steps of editing, further defining, and simulating are not shown as a loop in this diagram, it is to be understood that these steps may be performed in a loop as many times as desired to obtain satisfactory program operation.

Upon completion of the programming, and in light of the enumeration of the various hardware elements connected to the system, automatic generation of a mapping of program functions to selected hardware elements is performed (block 835). The mapping can be visualized to make it clear as to which parts of their application goes on which hardware component. The mapping respects the constraints such as throughput, latency, cost, and other implementation constraints. After the initial mapping is complete, the operation of the program with its constituent functions mapped to the selected hardware elements may be simulated (block 840). Upon completing the simulation, a determination may be made as to whether the operation of the program functions on their assigned hardware elements is correct. If for one or more reasons the operation is determined not to be correct (block 845, no), an indication may be given that the mapping is unsatisfactory and that a new mapping is desired (block 850). Factors causing determination of an unsatisfactory mapping may include a failure to meet timing requirements or other constraints, or the inability of a particular program function to execute properly on a hardware element to which it is mapped. Thereafter, a new mapping may be regenerated (block 835), and the simulation performed once again (block 840). If, on a particular iteration, the operation is considered to be correct and satisfactory (block 845, yes), the method is complete.

Figure 9:
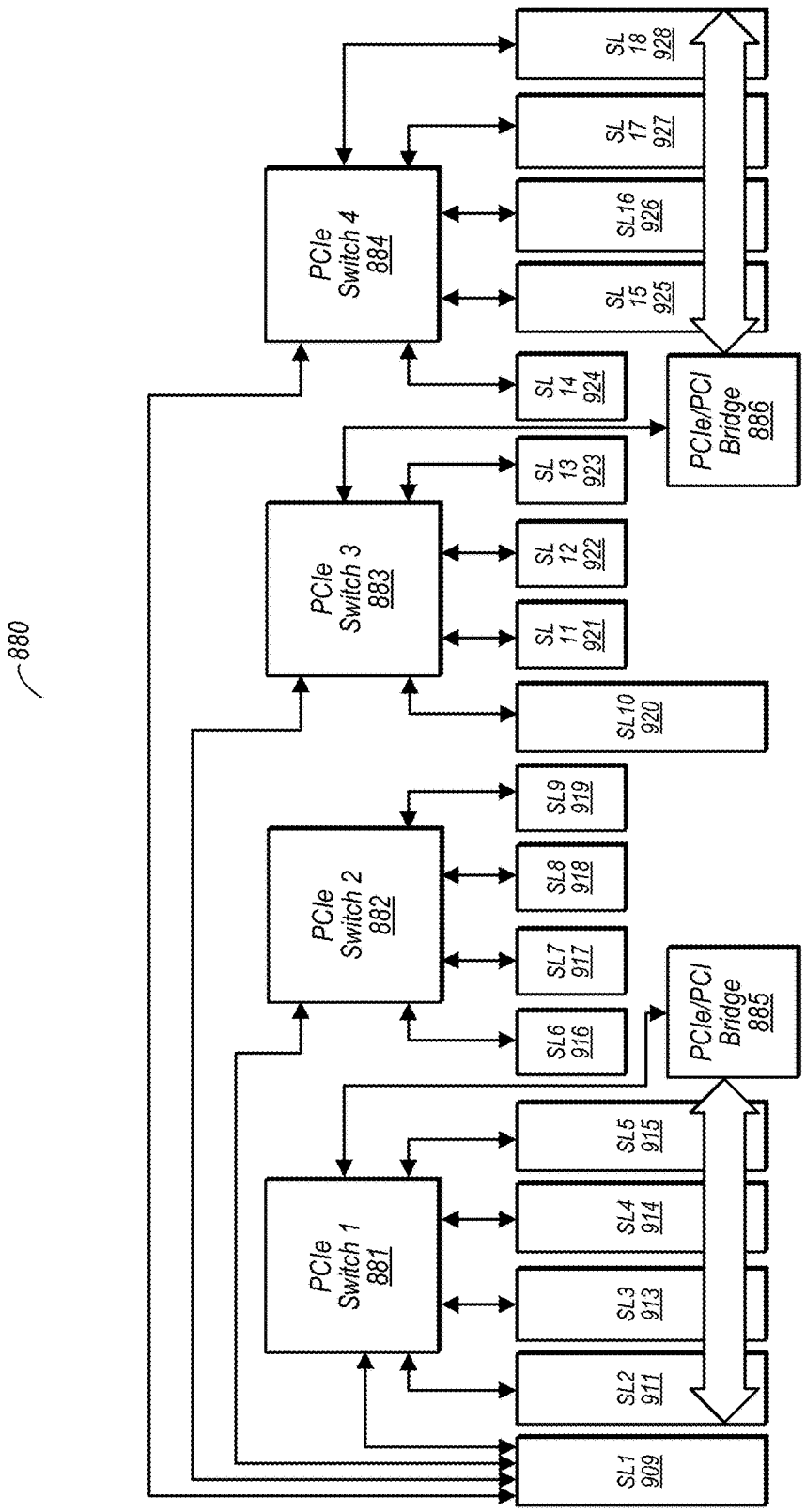
FIG. 9 is a diagram illustrating one embodiment of an exemplary hardware configuration to which automatic mapping of program functions may be performed.
Figure 10:
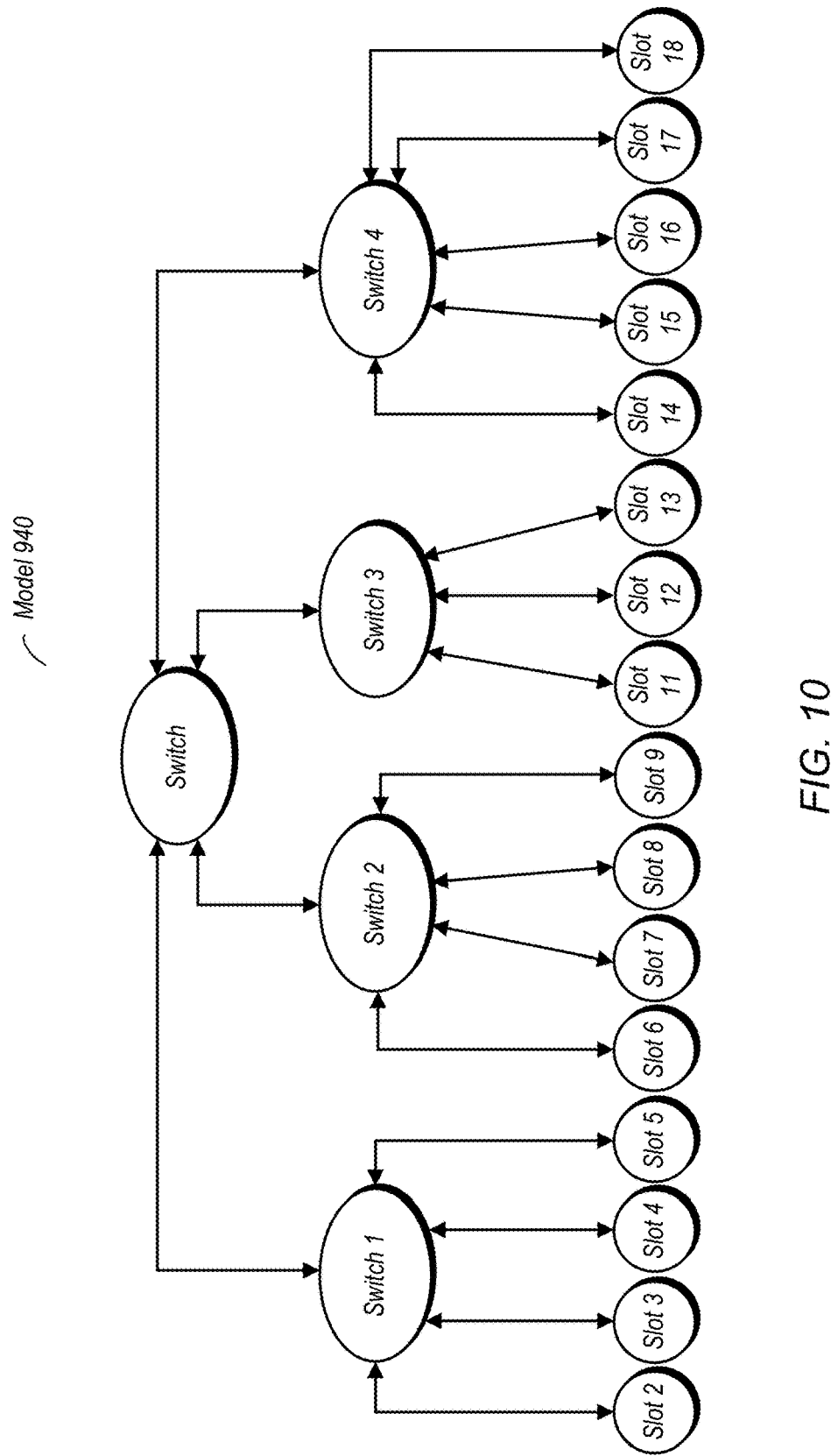
FIG. 10 is a diagram illustrating one embodiment of a platform model for the hardware embodiment of FIG. 9.

FIGS. 9 and 10 are diagrams illustrating one embodiment of an exemplary hardware configuration to which automatic mapping of program functions may be performed. In the embodiment shown in FIG. 9, hardware system 880 includes a number of PCIe switches 881-884, and a pair of PCIe/PCI bridges 885 and 886. The slots 909-928 can be configured to include multiple different types of FPGAs with varying speeds and capacities, timing modules, and I/O modules. The slots are interconnected by a hierarchy of switches that supports sharing of the high-bandwidth backplane between communication streams arising from different slots. In one embodiment, the example of FIG. 9 may be a PXIe-1075 system, although the disclosure is not limited to such embodiments.

Figure 11:
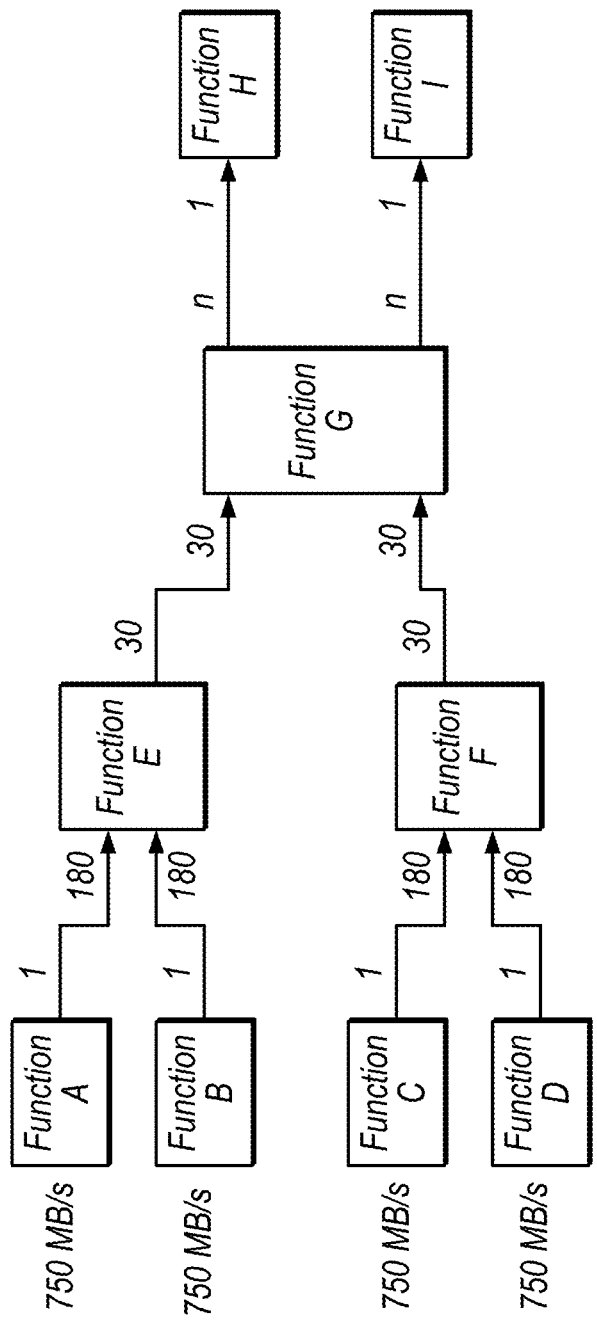
FIG. 11 is a diagram illustrating a multi-rate data flow representation of another embodiment of a software program having multiple program functions.

FIG. 10 is a more generic version of FIG. 9, and includes a hierarchy of switches and a number of slots configured to receive, e.g., FPGAs (although the ability to accommodate other types of components are possible and contemplated. While the switches may be PCIe switches, as in the embodiment of FIG. 9, the use of other types of switches is also possible and contemplated. Attributes for the communications portion of this system may include bandwidth on each link and the number of separate channels that each link can support. The components implemented in the various slots may be of different types may have different attributes such as number of slices, number of registers, available random access memory (RAM), etc. The illustrated system may have a particular bandwidth model for unidirectional and/or bidirectional traffic and bandwidth may be shared (linearly in some implementations) between competing streams. These attributes may be taken into consideration when mapping program functions to the illustrated hardware FIG. 11 is a diagram illustrating a multi-rate data flow representation of another embodiment of a software program having multiple program functions and mapped to a specific hardware configuration. In particular, FIG. 11 is similar to FIG. 4A, in that is shows a multi-rate data flow representation of a software program with program functions A-I. In the embodiment shown, each of Functions A-D is an input function that produces 1 data token per firing or execution. Functions E and F may each consume 180 data tokens on each of its inputs and produce 30 data tokens per firing or execution. Function G may for example consume 30 data tokens on each of its inputs and output 60 data tokens on two separate signal paths. Functions H and I are output functions that consume 1 data token per firing. These consumption and production rates for each program function may be considered to be constraints. Accordingly, mapping of these functions to particular hardware elements may thus be based at least in part on the consumption and production rates of the particular program functions. Thus, for a given program function, its mapping to a particular hardware elements may be predicated on that element being able to produce and consume data in accordance with the specified data rates. Hardware elements incapable of producing or consuming data at the specified rates may be excluded as target candidates for particular program functions. Consider an exemplary situation where functions A to D each produce 750 MB/s of data. Functions E and F act as downsamplers that scales down the throughput by 6. Hence the throughput of the streams at the outputs of E and F would be 125 MB/s. Function G acts as an upsampler that scales up the throughput by a factor of 2 on each of its outputs. Hence the throughput of the streams at the outputs of G would be 250 MB/s. The data rates in the multi-rate dataflow representation statically determine the throughputs of all communication channels in the application. If, say, function G consumes 30 data tokens per firing on each of its input channels and produces 120 data tokens on each of its output channels, then the throughputs of the two streams at the outputs of G would each be 500 MB/s. Thus the data rates of functions influence the throughputs on the communication channels in the application. When the application is mapped to a hardware system, the mapping must ensure that these throughputs can be sustained by the processing and communication elements in the hardware.

Figure 12:
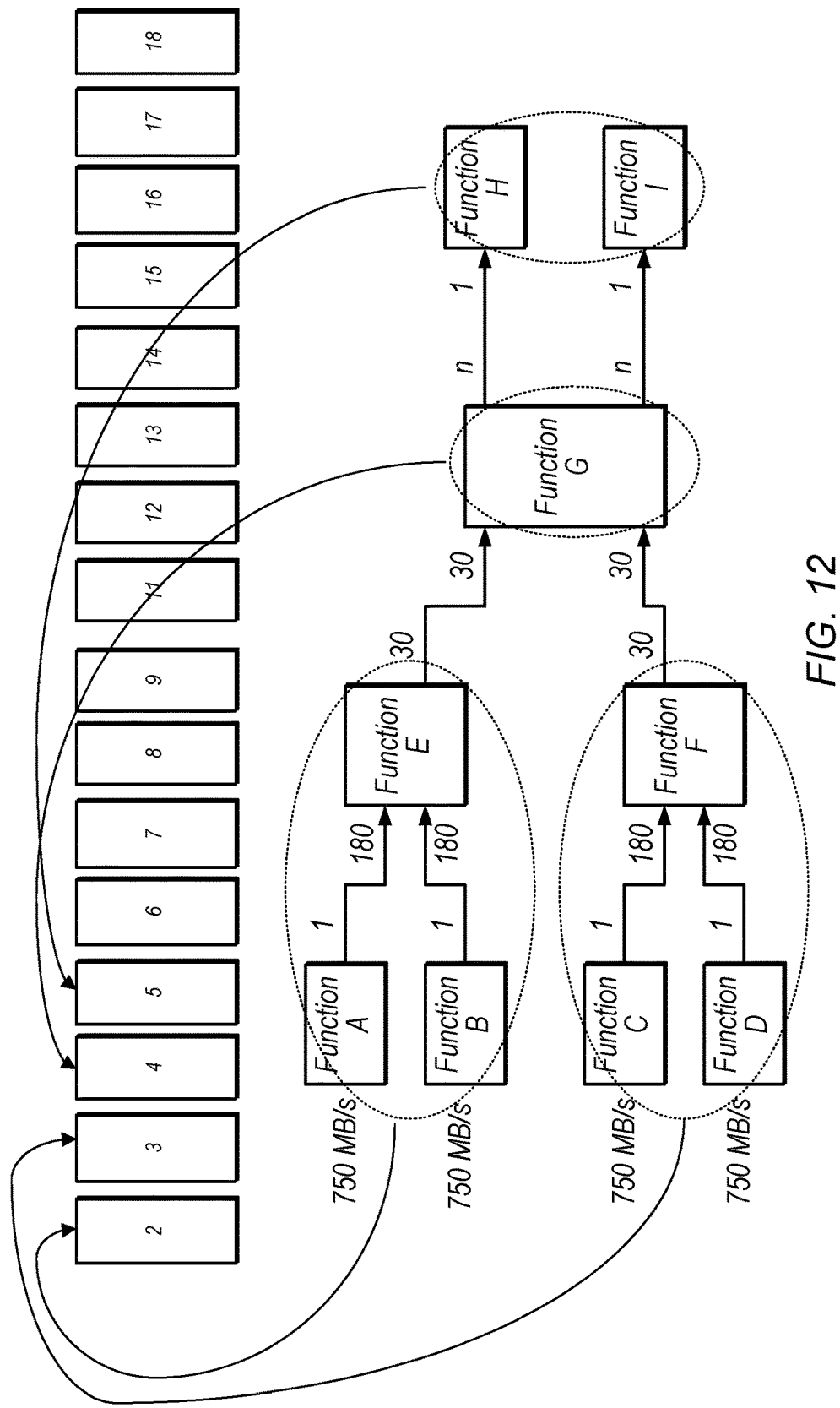
FIG. 12 is a diagram illustrating mapping of various functions of the program of FIG. 11 to various hardware elements.

FIG. 12 is a diagram illustrating an exemplary mapping of various functions of the program of FIG. 11 to various hardware elements. In this example, program functions A, B, and E are mapped to a hardware device (e.g., FPGA) in Slot 2, while functions C D and F are mapped to a device in Slot 3. Function G is mapped to a device in Slot 4, while functions H and I are mapped to a device in Slot 5. The aggregate throughput of the communications between functions E and F in the devices of Slots 2 and 3, respectively, and G in the device in Slot 4 would be 250 MB/s, which can be sustained by the PXI backplane. Similarly, the aggregate throughput of the communications between function G in the device of Slot 4 and functions H and I in the device of Slot 5, would be 1000 MB/s, which is within the bandwidth of 838 MB/s than an exemplary PXIe system can sustain. However, if function G is altered to produce 120 data tokens on each of its output channels, then the aggregate throughput of the communications between function G in the device of Slot 4 and functions H and I in the device of Slot 5, would be 1000 MB/s, which is greater the bandwidth of 838 MB/s than an exemplary PXIe system can sustain. Such a mapping then would be determined to be infeasible as it violates the communication bandwidth limits of the hardware components.

The mapping is performed automatically based on various factors. Given factors include a system data flow model, which includes data production and consumption rates, the initiation interval (II) and execution time (ET) characteristics of actors (which essentially measure how much time they take to compute), and the area of the actors (e.g., on a hard hardware target). Another given factor is the platform model, which includes the type of platform, the architecture of the platform, the communications topology (e.g., P2P, or peer-to-peer), area bounds, and clock frequencies of the various hardware elements.

Based on the given factors above, the mapper may compute a mapping, allocating various functions of the program to various hardware elements. In performing the allocation, consideration is given to bandwidth limitations and area limits on targets. There may also be bounds on a number of P2P links for some targets. The mapping may also be performed in light of constraints on grouping (e.g., a desired grouping of program functions on particular hardware elements as input by a user), exclusions (e.g., exclusion of particular program functions from hardware elements on which specified other function mapped to a particular hardware element), and affinity. During the mapping, the mapper engine may perform various optimizations, such as throughput maximization, minimization of the number of targets, and alternate multi-objective functions that may combine performance, area, and cost.

Figure 13:
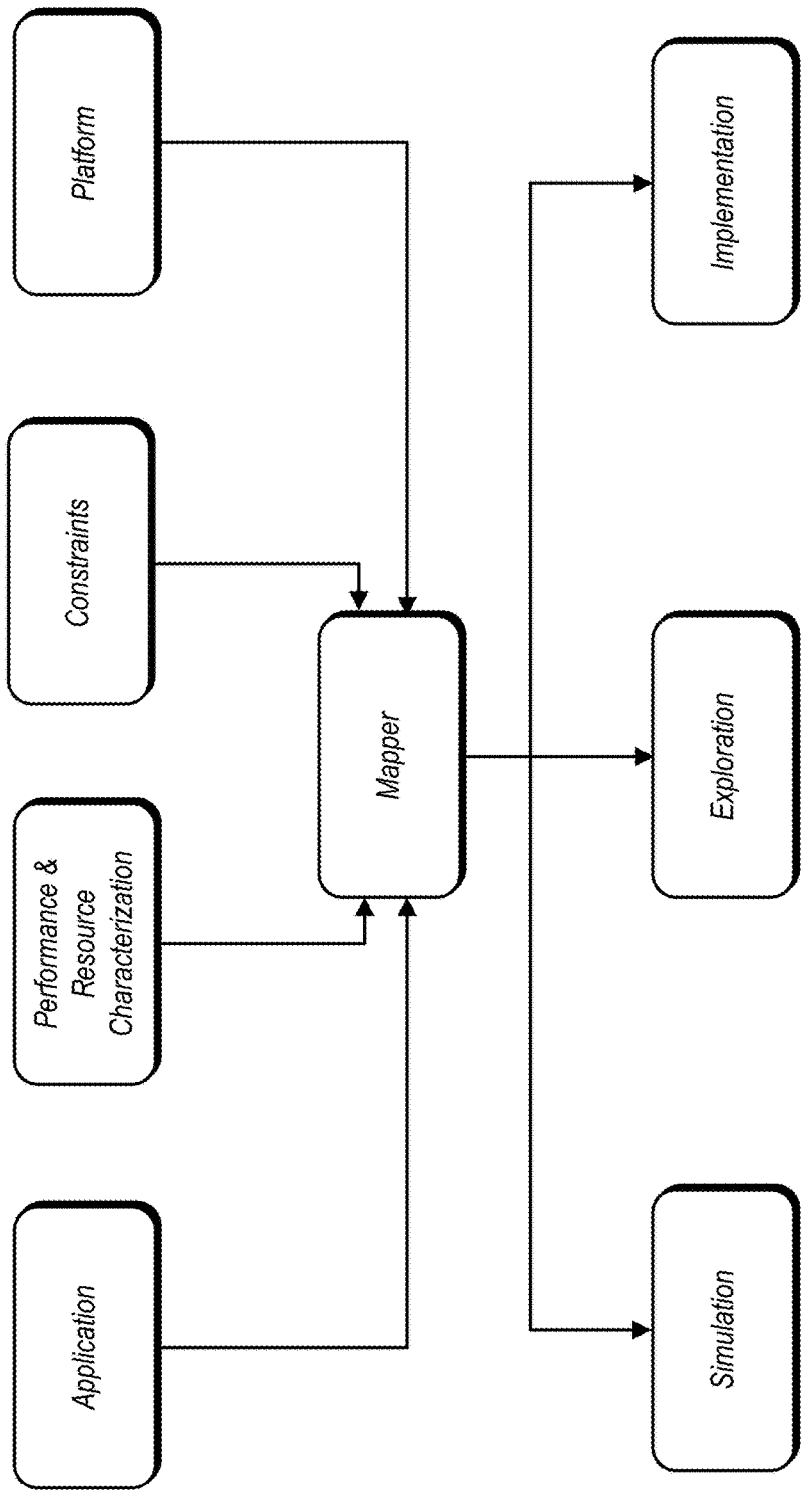
FIG. 13 is a diagram illustrating an OOMO framework for one embodiment.

FIG. 13 is a diagram illustrating an OOMO framework for one embodiment. In the embodiment shown, the mapper has four main inputs: the application (i.e. the program), performance and resource characterization, constraints, and the platform (i.e. available hardware and elements thereof). Based on these inputs, the mapper may determine a mapping of different functions of the program to the available hardware elements. Outputs from the mapper may include simulation of a mapping, exploration of alternate mappings, and implementation of a particular mapping. This framework is now discussed in further detail with reference to FIG. 14.

Figure 14:
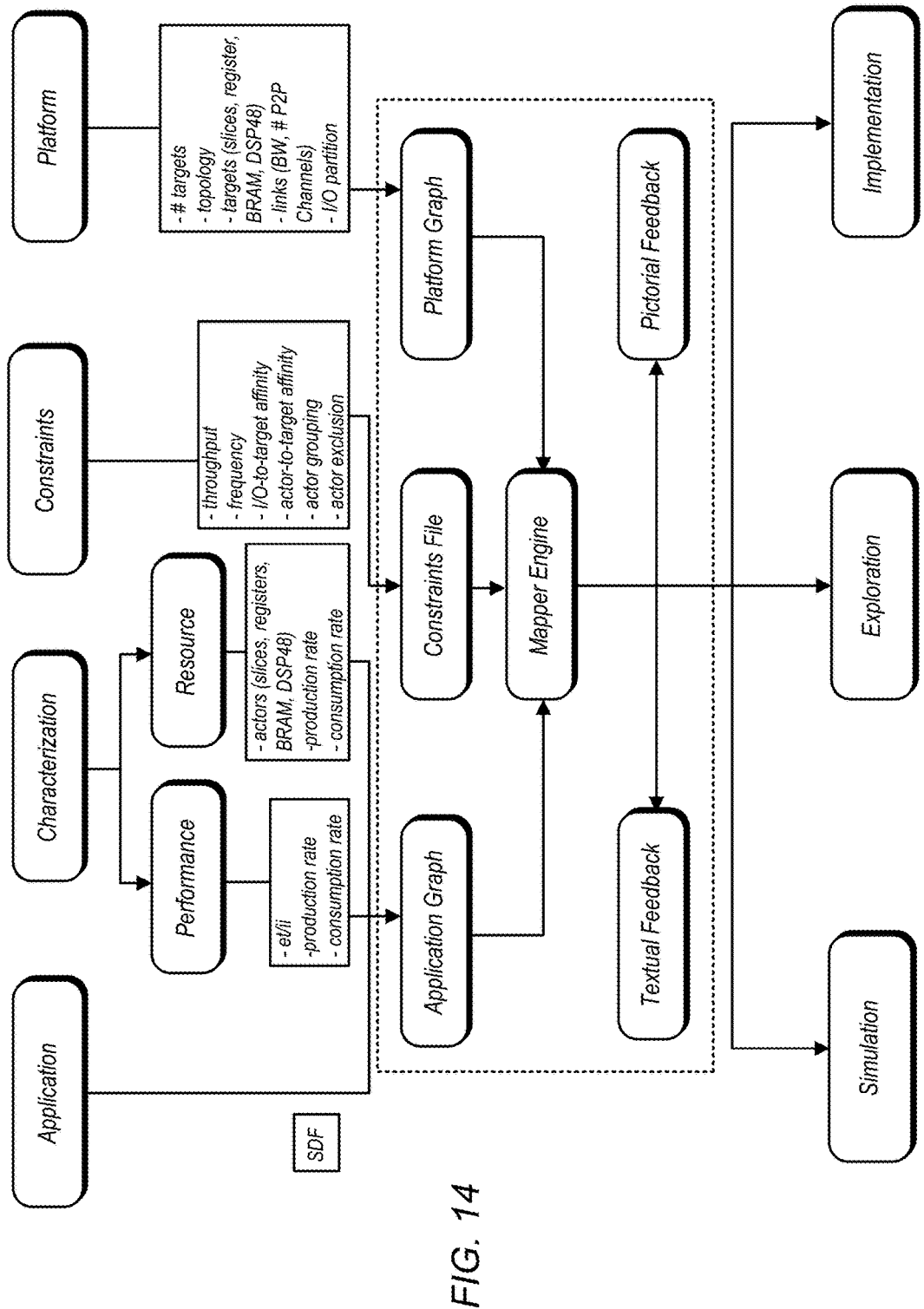
FIG. 14 is a diagram illustrating further details of one embodiment of an OOMO framework.

FIG. 14 is a diagram illustrating further details of one embodiment of an OOMO framework. The mapper in the embodiment shown may include a number of different elements. The application graph may include information regarding the application itself, as well as performance and resource information from the characterization element. This information may include factors such as production and consumption rates (from the perspectives of both the performance and resource elements) as well as actors such as availability of registers, RAM, and so on. The constraints file may include information regarding the various constraints received from the constraints element, with the information being presented in textual form, graphical form, or a combination thereof. The information in the constraints file may be input manually by a user, or may be generated based on other information. For example, I/O-to-target affinity and actor-to-target affinity may be based on information from potential hardware target elements for the program functions that may be automatically obtained from these elements. On the other hand, actor exclusion (i.e. pre-emptively excluding some portions of the program from some hardware elements) may be manually input into the constraints file by a user. Information regarding the hardware platform may include the number of targets and characteristics thereof (slices, registers, etc.), hardware topology, communications link, and so forth.

Information from the application graph, the constraints file, and the platform graph may be provided to the mapper engine. Based on this information, the mapper engine may automatically generate a mapping of program functions to hardware elements. The mapping engine may provide an output indicative of the mapping that includes feedback in both textual and pictorial form.

Once an initial mapping has been performed, simulation may be conducted to determine whether or not the generated mapping operate both correctly and satisfactorily. The framework may also allow for the exploration of alternative mappings. When a mapping is deemed satisfactory, the framework also allows for implementation of the program functions on the selected hardware elements.

Timing Constraints and Generation of Timeline Dependency Graphs

As noted above, the various program function constraints include timing constraints. These timing constraints may be included within the constraints considered in the mapping of program functions to various hardware elements.

A program as discussed herein may be described by a dataflow model, which may include timing configurations for nodes of the program. These nodes may facilitate construction of a deterministic dataflow model with precise timing. The nodes each represent functions that consume input data and product output data. A given node may begin execution upon receiving sufficient input data. If there are insufficient inputs available at the time the program function (represented by the node) is to execute, a timing violation occurs.

For a particular node, a timing configuration associated therewith may specify the time at which the node needs to execute. Timing configurations may specify various timing related parameters associated with a node, e.g., time stamps, periodic execution times, event triggers, and so forth. For inputs to and output from a node, timing configurations can specify I/O timing behavior independent of node internals. A dataflow model based on the various timing constraints may be used to conduct an analysis to thereby ensure that a specific platform can properly execute the program.

In some embodiments, timing specifications are specified for timed multi-rate data flow (TMRD) programs. In some embodiments, a TMRD includes: multi-rate data flow nodes and source nodes (also referred to as I/O nodes) which read from or write to the environment. These interactions are also referred to as side effects. In some embodiments, a TMRD also includes timing configuration nodes and two types of connections for (1) data flow between nodes and (2) connecting timing configuration nodes and data flow nodes.

The timing of I/O node side effects may be specified using timing configuration nodes. The timing may be specified using (a) absolute time, (b) periodic timing with a period and an offset within the period, and/or (c) event triggered where the exact time is not known but certain property of event occurrence may be known.

As is further discussed herein, timing and functionality may be presented to the user in a more intuitive manner using a timeline dependency graph (TDG). In some embodiments, a TDG shows: a timeline depicting a continuous time frame, every execution of an I/O node during the time frame that is depicted by the time line (where I/O node executions are visually connected to the timeline), and every execution of other nodes (non-I/O nodes) during the time frame that is depicted by the time line (non-I/O node executions may be connected to other nodes in order of the data flow dependencies).

In some embodiments, there is a one-to-one mapping between a TMRD and a TDG. In some embodiments, the TDG representation may allow the user to identify what components communicate at what times. A TMRD execution may be valid if the I/O nodes execute at the time specified by the timing constraints. TMRD's may be mapped to different platforms. A TMRD and/or TDG may allow an OOMO system to perform an analysis of consistency, deadlock, latency on paths, the period of any node, etc. for various mappings. In some embodiments, an OOMO system is configured to determine whether a given data flow program is schedulable/executable on a given target hardware platform based on worst-case execution time information and a known scheduling policy.

In some embodiments, all TMRD nodes are synchronized. In some embodiments, timing analysis may be performed based on a threshold acceptable synchronization error.

Figure 15:
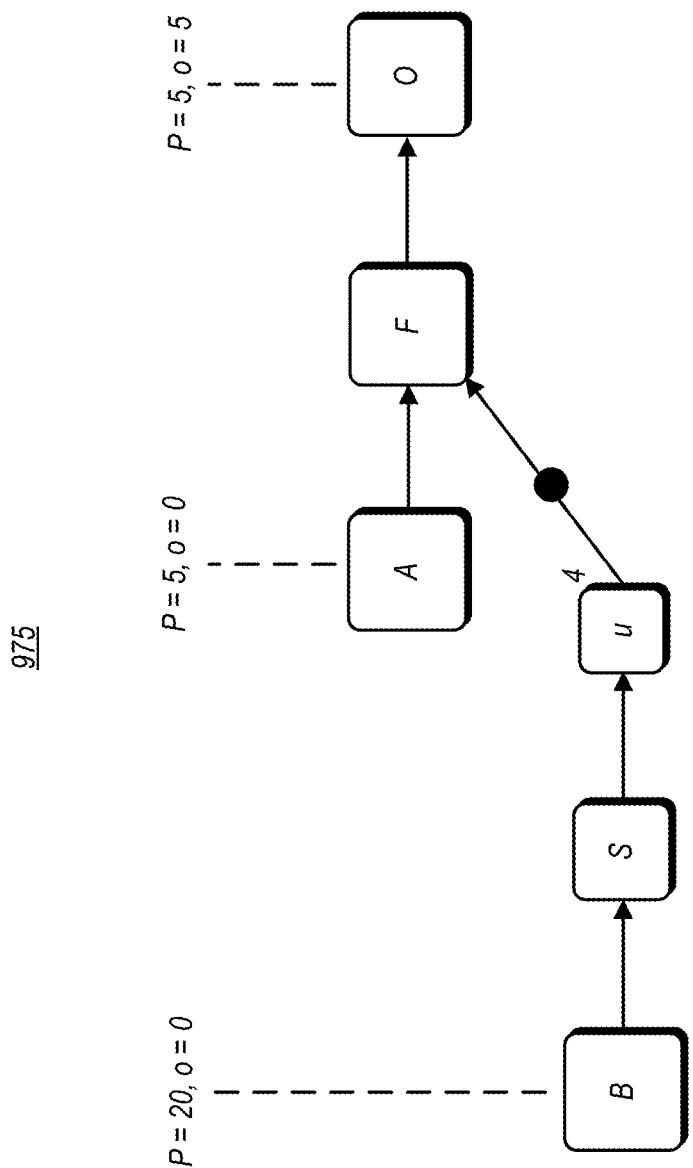
FIG. 15 is an illustration of a multi-rate dataflow diagram with timing configurations for one embodiment of a program.

Turning now, to FIG. 15, an exemplary timing diagram for one embodiment of a TMRD program. One popular pattern in control systems is cascaded control loops in which inner loops react to short term changes in an environment while outer loops react to longer term changes to the environment. In order for such a system to properly function, the sum of the computations in the inner loop are performed faster than those of the outer loop. FIG. 15 illustrates one embodiment of a cascaded control loop, in the form of TMRD program 975. The various blocks shown in the diagram are representative of nodes, or program functions, within the TMRD program.

In the example shown, the inputs sensed from the environment are represented by blocks A and B. Block F represents the faster computation of the inner loop, while block S represents the slower computation of the outer loop. The input represented by block A is configured to be sampled every 5 time units with 0 offset within the period. Thus, block A is executed and produces a token (i.e. output) every 5 time units, e.g., at time 0, time 5, time 10, and so forth. The input represented by block B on the other hand is sampled every 20 time units. Block O produces an output every 5 time units, with an offset of 5 within the period. This means that a first output is written at time 5, a second output is written at time 10, and so forth. The time specification on block A and O indicate that block F is to execute between time 0 and time 5 in order to compute a new token for block O to write.

In accordance with synchronous dataflow rules that apply to this program, each node is able to execute with at least one input. The node represented by Block F in this example includes two inputs, with the second input coming from Block B at a slower rate than the first input that is coming from Block A. Accordingly, an upsampling node, u, is implemented, to produce 4 tokens for each 1 token received. In some possible implementations, the upsampling node could produce 4 tokens with the same value, predict values of future tokens, or implement some other type of application specific logic.

Since the computations performed in the slow branch may take a longer time, tokens for block F coming from the slow branch may not be available in time for Block F to produce a new token for Block O. Thus, delays or initial tokens, represented by the solid black circle in the connection between Block u and Block F, may be introduced in order to enable Block F to perform its computations.

In order to produce a TDG for the program represented by the dataflow model shown in FIG. 15, various inputs may be provided. In particular, these inputs may be provided to a TDG generation program.

Figure 16:
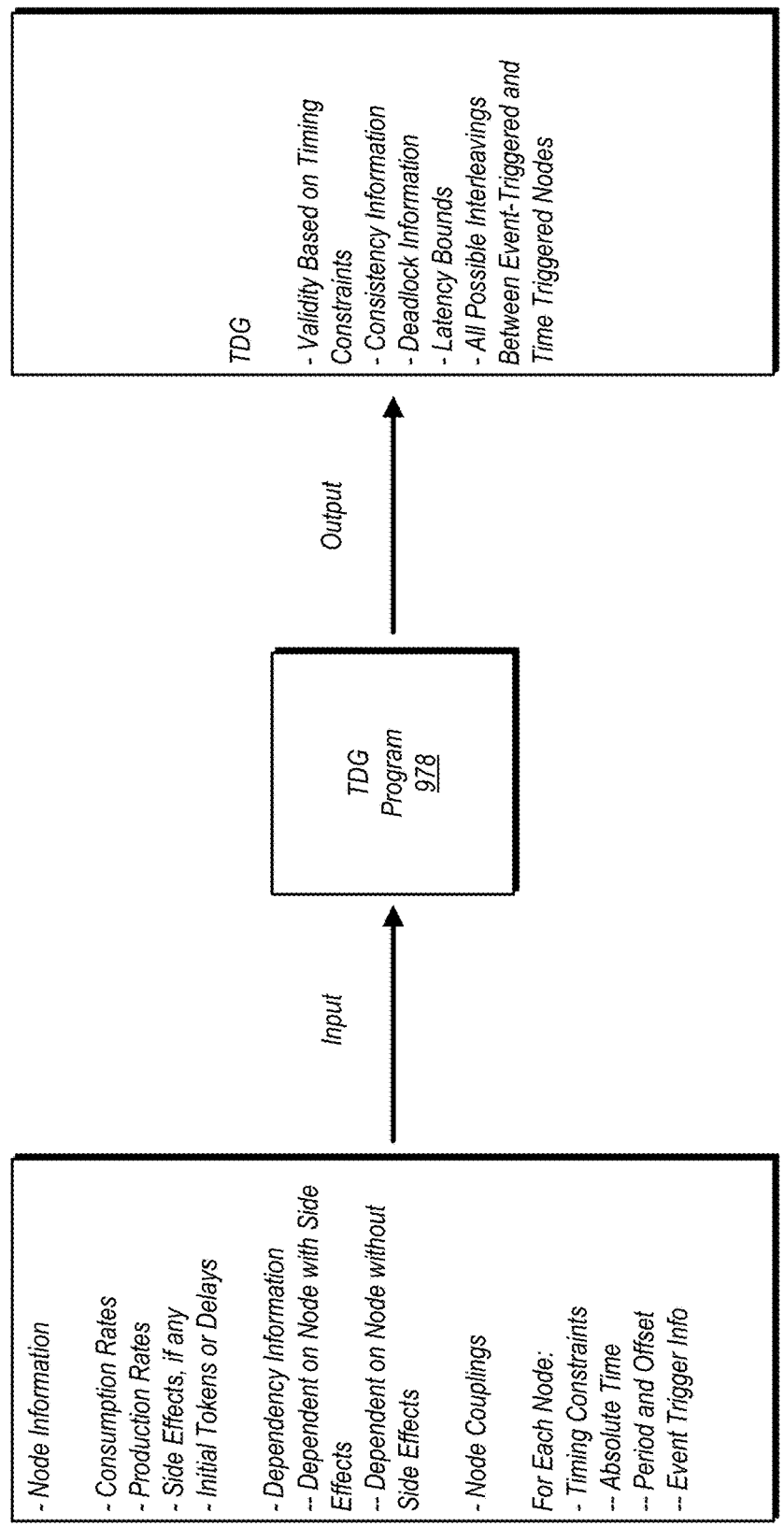
FIG. 16 is an illustration of inputs and outputs for one embodiment of a method for generating a timeline dependency graph.

FIG. 16 illustrates the various inputs and outputs for one embodiment of a TDG program that can be executed on a computer system. In the embodiment shown, various inputs are provided to TDG program 978. Using this information, TDG program 978 may produce a TDG graph, the output of which provides various information, such as the validity of the model based on timing constraints and data rates, latency bounds, and possible interleavings between time triggered and event triggered nodes.

On the input side, node information describing each node (and thus, corresponding program function) is provided. Additionally, for each node consumption rates (i.e. the rate at which the node consumes data) and production rates (i.e. rates at which the node produces data). Information regarding side effects, if any, for each of the nodes may also be provided. Side effects as defined herein may be interaction with the external/physical environment through a given node (e.g., inputs received from the physical environment, outputs provided to the physical environment). Information regarding initial tokens or delays on any of the connections between nodes may be provided. Dependency information may also be provided to indicate which nodes are dependent on other nodes that have side effects, and which nodes are not dependent on others having side effects. More generally, couplings between the various nodes are also provided for purposes of modeling program flow and determining interactions between the nodes.

For each node, timing constraint information may be provided. Timing constraints may include absolute time (e.g., a time at which an event should occur or when a program function should process data), period and offset information (e.g., the program function is to execute at or within a certain period, with an offset time, if any), and event-triggered timing information (e.g., when the exact time of execution is not known, but one or more properties of an occurrence that triggers execution is known).

The various inputs provide to the TDG program 978 are exemplary and are not intended to be all-inclusive. Other timing constraints are also possible and contemplate, and may thus be used in generation of a TDG for a particular TMRD program.

Using the various received inputs, TDG program 978 may generate a TDG having (or in conjunction with) additional information describing program operation over time. Such information may include validity of the program for the given timing constraints (e.g., whether the program can properly execute given the provided constraints on timing). Information regarding consistency (e.g., consistent sample rates) and deadlocks (e.g., inconsistent delays that can lead to undesired halting of program execution) may also be provided. Latency and latency bound information may be provided to indicate latency through particular nodes, overall program latency, and the bounds of latency through various nodes that enable desired program operation. Information regarding all of the various possible interleaving's of the program between event-triggered and time-triggered nodes may also be inferred.

Figure 17:
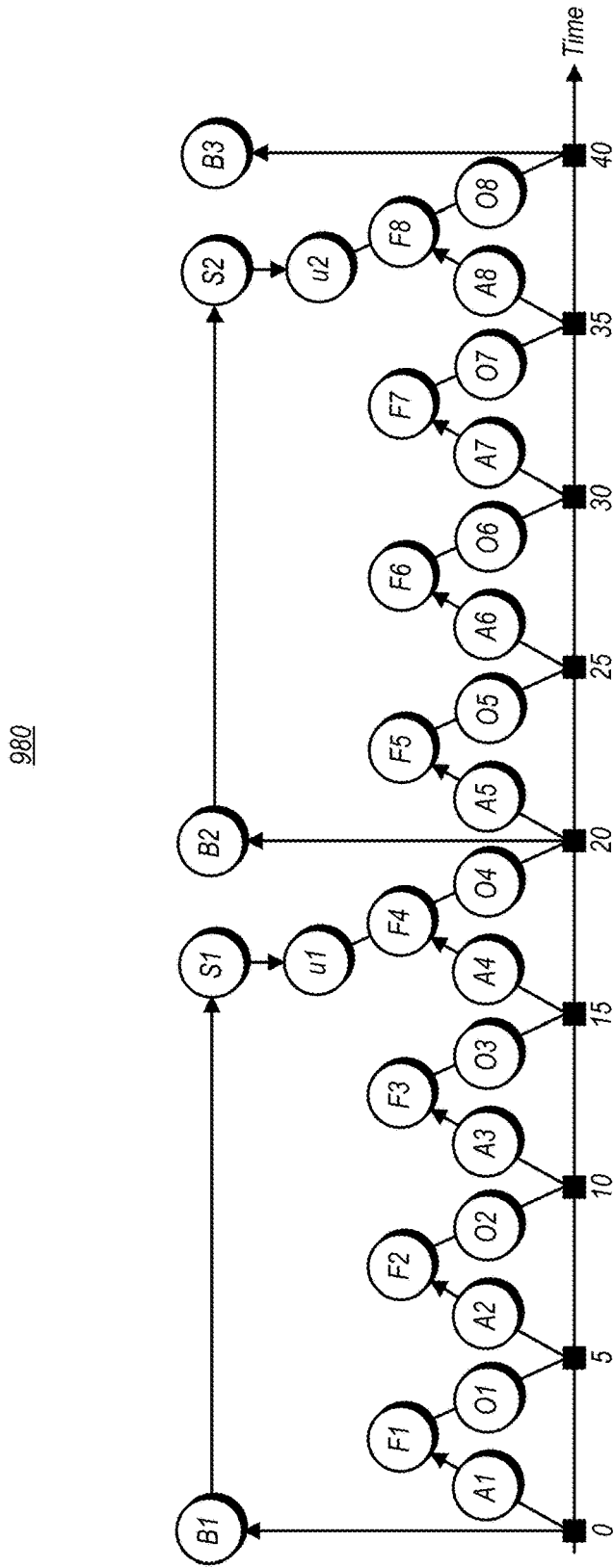
FIG. 17 is exemplary timeline dependency graph for the program embodiment of FIG. 15.

FIG. 17 is a diagram illustrating an exemplary TDG for one embodiment of a TMRD program. In particular, the example shown in FIG. 17 provides information regarding the program illustrated by the TMRD diagram of FIG. 15.

TDG 980 in the embodiment shown illustrates the timeline and data dependency of the first 40 time units of execution of the program of FIG. 15. As noted in the discussion of FIG. 15, the program includes a faster inner loop and a slower outer loop. The inner loop receives an input on node A, while the outer loop receives an input on node B. The numerals accompanying the letters in each block (e.g., A1, A2, F1, F2, etc.) refer to the nth execution of a node. Thus, A1 refers to the first execution of node A, F3 refers to the third execution of node F, etc. The various instances of nodes shown in TDG 980 that are connected to the timeline are done so at points in time where they are to execute. Those nodes that are not connected to the timeline (e.g., F1, F2) may execute when possible, although these nodes may provide output to enable nodes coupled to the timeline to execute at the desired time. For example, each node O may execute after receiving output from node F. Furthermore, as shown in this particular example, each execution of node O is to occur at or prior to intervals of 5 time units, e.g., node O1 is to execute by the $5^{th}$ time unit, node O2 is to execute by the $10^{th}$ time unit, and so forth. Each node F on the other hand, may execute at any time after receiving sufficient inputs. Thus, for example, node F1 may execute at any time between the $0^{th}$ and $5^{th}$ time interval after receiving output from node A1, node F2 may execute at any time between the $5^{th}$ and $10^{th}$ time interval after receiving output from node A2, and so on. Each node A in this example should execute in time to enable node O to execute on time. As shown in TDG 980, nodes A, F, and O execute four times for each single execution of nodes B and S. As previously noted, node u provides an upsampling to node F.

From the exemplary TDG 980 shown in FIG. 17, information about execution of the program may be derived. First, between sensing a new input on node B and influencing the output on node O, it takes between 20 and 35 time units. Second, the total execution time of nodes A, F, and O combined should be completed within 5 time units. Third, the total execution time of nodes B, S, u, F, and O should be completed within 20 time units. Fourth, TDG 980 also indicates that the first three outputs use initial values, and thereafter execution is repeated periodically. Fifth, the overall iteration length of this particular dataflow model is 20 time units.

Thus, as illustrated above, TDG 980 clearly illustrates the various timing dependencies of TMRD program 975 of FIG. 15. Nodes including side effects in this particular example include nodes A, B, and O. Accordingly, these nodes may be subject to relatively strict timing requirements. Nodes that do not include side effects in this example are nodes F, S, and u. These nodes that do not have side effects may have looser timing requirements that are bounded only by the nodes having side effects upon which they have a dependency.

Generally speaking, TDG program 978 of FIG. 16 may generate TDGs such as the exemplary one shown in FIG. 17 for a wide variety of TMRD programs. Each TDG may reflect the various timing dependencies, constraints, execution time bounds, and so forth that are unique to its corresponding TMRD program. Accordingly, the exemplary TDG shown in FIG. 17 is not intended to be limiting in any way, but is instead but one possible TDG that corresponds to a given TMRD program. The exact form and information conveyed by TDGs is at least as varied as the possible forms a TMRD program may take. Using a TDG such as that shown in FIG. 17, a computer system may factor the information contained therein when mapping program functions to hardware processing elements, as previously discussed.

Figure 18:
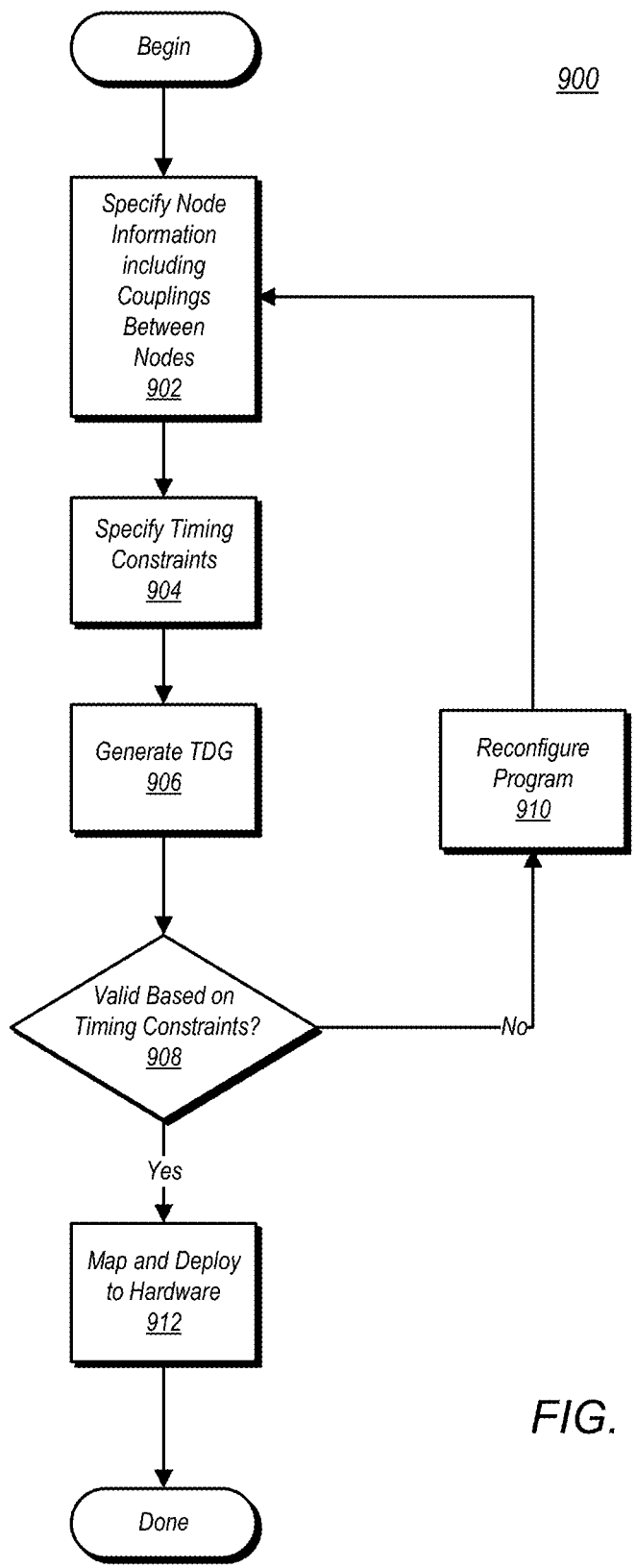
FIG. 18 is a flow diagram illustrating one embodiment of a method for generating a timeline dependency graph.

FIG. 18 is a flow diagram of one embodiment of a method for generating a TDG. Method 900 as shown in FIG. 18 may be performed by a computer system having a corresponding TDG generation program implemented therein and having received at least some of the various timing constraint inputs discussed above. It is noted that the order of steps shown in method 900 is not intended to be limiting, and thus the various orders of at least some steps can be rearranged relative to others.

Method 900 begins with the providing of node information, including couplings between nodes, to a TDG program (block 902). Additionally, timing constraint information, both for individual nodes and the program as a whole is also provided in the embodiment shown (block 904). As noted above, the node information may specify parameters of a node such as data consumption and production rates, side effects, dependencies, and so on. Timing constraint information may indicate the constraints on timing for the given nodes and the program as a whole.

Using the input information, a TDG may be generated (block 906). After generation of the TDG, the validity of program operation may be determined. If the program operation is determined to be invalid (e.g., it cannot execute based on the input information; block 908, no), the program may be reconfigured (block 910) and the process may be repeated. Reconfiguring the program can take many forms, such as altering the timing constraints for various nodes, altering interconnection there between, and so forth.

If the program operation is determined to be valid and satisfactory (block 908, yes), the program may be mapped and deployed to hardware in accordance with the various embodiments of a mapping methodology discussed above (block 912).

Figure 19:
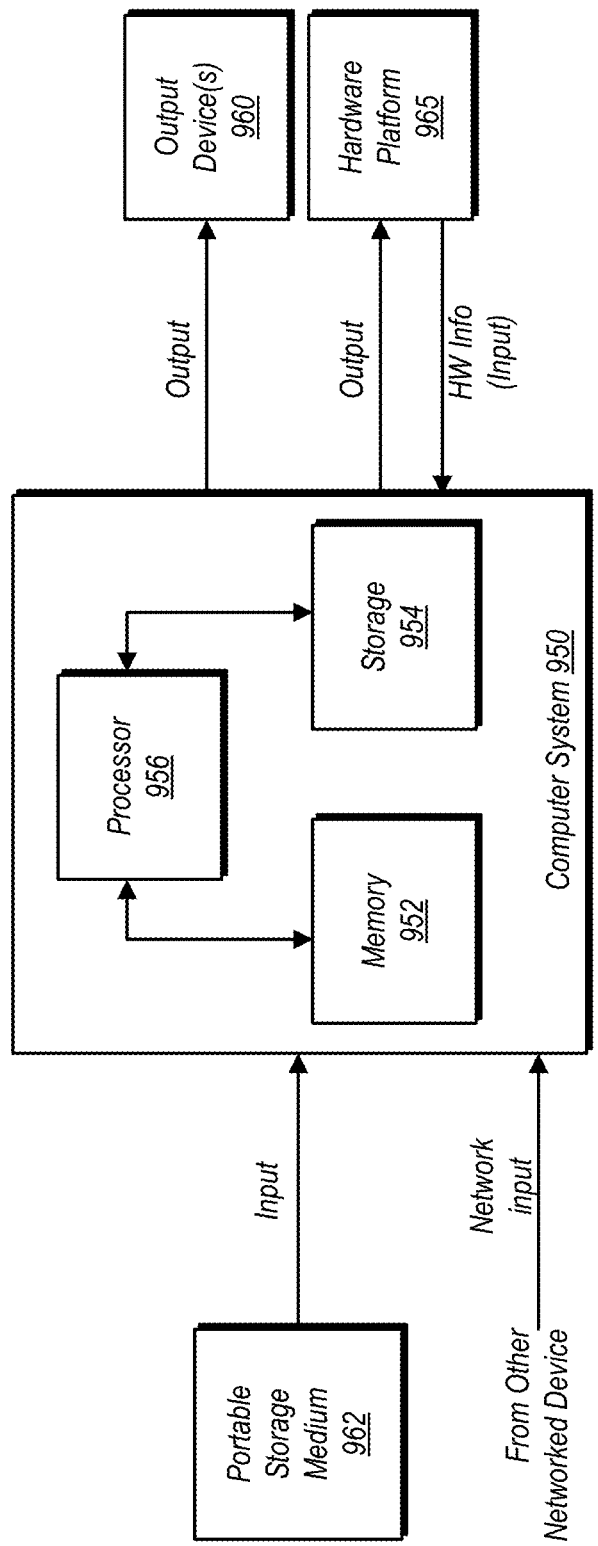
FIG. 19 is a block diagram of one embodiment of a computer system configured to carry out the various methodologies discussed herein.

FIG. 19 is a block diagram of one embodiment of a computer system that may carry out the various methodologies discussed above. In the embodiment shown, computer system 950 includes a processor 956, a memory 952, and a storage unit 954. Computer system 950 may receive inputs through e.g., a portable storage medium 962, or from other devices via a network input. Additionally, a hardware platform 965 to which a program is to be mapped may be coupled to computer system 950, and may provide inputs regarding hardware processing element attributes, although in other embodiments these attributes may be provided from another source (e.g., portable storage medium 962).

Portable storage medium 962 may be any type of non-transitory storage medium, such as a USB drive, a CD- ROM, or Blu-Ray disk. Programs and data may be input into computer system 950 from portable storage medium 962, and stored in storage unit 954. Storage unit 954 may also be a non-transitory storage medium, such as a hard disk drive or flash drive, and may provide non-volatile storage. Memory 952 may be a non-transitory memory such as Random Access Memory (RAM) that provides general purpose memory for operations carried out by processor 956 on computer system 950.

The programs that may be input into computer system 950 from either portable storage medium 962 or from the network input include various embodiments of the program to perform the automatic mapping of various program functions to various hardware processing elements of a hardware processing program. The program for performing automatic mapping may carry out the mapping function without any user input beyond providing the initial data (e.g., from portable storage medium 962, a database stored in storage unit 954, etc.). In additional to executing instructions to perform the automatic mapping described herein, processor 956 may also execute instructions to simulate operation of the mapped program functions on the various hardware elements. The results of the mapping may be provided to output device(s) 960, which may include a display, a printer, or other device. Additionally, if a hardware platform 965 including the selected hardware processing elements is coupled thereto, computer system 950 may deploy the program functions to the selected hardware processing elements in accordance with the mapping.

Computer system 950 may also perform generation of TDGs as discussed above. The programs and data used in TDG generation may be provided through the network input, from portable storage medium 962, or may be stored in storage unit 954. A TDG generated on computer system 950 may be output to one or more output devices 960, including a display or a hardcopy printed by a printer. A TDG and the information contained therein may also be stored in, e.g., storage unit 954, for later use in generating a mapping of program functions to hardware processing elements.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   by a computer system comprising a processor and a non-transitory memory medium:
   storing, in the memory medium, node information for a plurality of dataflow nodes, wherein each of the nodes is a program function that consumes data on at least one input and produces data on at least one output, and wherein the node information includes couplings between particular ones of the nodes;
   storing, in the memory medium, timing constraints for one or more of the nodes;
   generating, using the processor, a timeline dependency graph (TDG) based on the node information, couplings between particular ones of the nodes, and the timing constraints, wherein the TDG includes a timeline, mappings between particular ones of the nodes that have side effects, on the timeline, to their respective firing times, and dependencies between nodes;
   displaying the TDG on a display unit coupled to the computer system; and
   mapping the plurality of dataflow nodes onto different ones of a plurality of heterogeneous hardware elements of a target system, wherein said mapping is performed based at least in part on a determination that the plurality of dataflow nodes comprises a valid program operation, and wherein the plurality of dataflow nodes are executable on the different ones of the plurality of heterogenous hardware elements according to the mapping.

2. The method as recited in claim 1, wherein the side effects for particular ones of the nodes comprise interaction with a physical environment via input/output (I/O) through those nodes.

3. The method as recited in claim 1, wherein the node information specifies consumption rates and production rates for multiple ones of the plurality of data flow nodes within a multi-rate dataflow program.

4. The method as recited in claim 1, wherein at least a portion of the timing information specifies timing constraints using absolute time.

5. The method as recited in claim 1, wherein at least a portion of the timing information specifies timing constraints using period information and offset information.

6. The method as recited in claim 1, wherein at least a portion of the timing information specifies timing constraints using event-trigger information.

7. The method as recited in claim 1, wherein the dependencies include dependencies between nodes having side effects and nodes having no side effects.

8. The method as recited in claim 1, wherein the TDG indicates whether a data flow program comprising the plurality of dataflow nodes is valid based on the timing constraints.

9. The method as recited in claim 1, wherein the TDG is configured to indicate the consistency, deadlock, latency bounds on paths, and period information of each node.

10. The method as recited in claim 1, further comprising determining all possible interleavings for a data flow program between event triggered and time-triggered nodes.

11. A system comprising:
at least one processor;
a display unit; and
a storage device storing a multi-rate dataflow program and a plurality of instructions that, when executed by the at least one processor, cause the system to:
store, in the storage device, node information for a plurality of dataflow nodes of the multi-rate dataflow program, wherein each of the nodes is a program function that consumes data on at least one input and produces data on at least one output, and wherein the node information includes couplings between particular ones of the nodes;
store, in the storage device, timing constraints for one or more of the nodes;
generate, using the processor, a timeline dependency graph (TDG) based on the node information, couplings between particular ones of the nodes, and the timing constraints, wherein the TDG includes a timeline, mappings between particular ones of the nodes that have side effects, on the timeline, to their respective firing times, and dependencies between nodes;
display, on the display unit, the TDG;
map the plurality of dataflow nodes onto different ones of a plurality of heterogeneous hardware elements of a target system, wherein said mapping is performed based at least in part on a determination that the multi-rate dataflow program comprises a valid program operation, and wherein the plurality of dataflow nodes are executable on the different ones of the plurality of heterogenous hardware elements according to the mapping.

12. The system as recited in claim 11, wherein the side effects for particular ones of the nodes comprise interaction with a physical environment via input/output (I/O) through those nodes.

13. The system as recited in claim 11, wherein the node information specifies consumption rates and production rates for multiple ones of the plurality of data flow nodes within the multi-rate dataflow program.

14. The system as recited in claim 11, wherein the node information specifies one or more of the following:
timing constraints using absolute time;
timing constraints using period information and offset information;
timing constraints using event-trigger information.

15. The system as recited in claim 11, wherein the dependencies include dependencies between nodes having side effects and nodes having no side effects.

16. The system as recited in claim 11, wherein the storage device further includes instructions that, when executed by the at least one processor, determine whether a data flow program is schedulable on a hardware platform based on the timing information, a scheduling policy, and worst-case execution times for the nodes, and includes further instructions, that when executed by the at least one processor responsive to determining that the dataflow program is not schedulable, perform at least one of the following:
inserting one or more downsample or upsample nodes on a failing path;
adjusting initial timing tokens;
adjusting period on one or more nodes;
adjusting one or more latency parameters; or
configuring one or more phase delay parameters.

17. The system as recited in claim 11, wherein the timing information further includes a synchronization error for synchronization between the nodes.

18. A non-transitory computer readable medium storing instructions that, when executed by a processor of a computer system, cause the computer system to perform the following:
store node information for a plurality of dataflow nodes of a multi-rate dataflow program, wherein each of the nodes is a program function that consumes data on at least one input and produces data on at least one output, and wherein the node information includes couplings between particular ones of the nodes;
store timing constraints for one or more of the nodes;
generate, using the processor, a timeline dependency graph (TDG) based on the node information, couplings between particular ones of the nodes, and the timing constraints, wherein the TDG includes a timeline, mappings between particular ones of the nodes that have side effects, on the timeline, to their respective firing times, and dependencies between nodes;
display the TDG on a display unit coupled to the computer system;
map the plurality of dataflow nodes onto different ones of a plurality of heterogeneous hardware elements of a target system, wherein said mapping is performed based at least in part on a determination that the multi-rate dataflow program comprises a valid program operation, and wherein the plurality of dataflow nodes are executable on the different ones of the plurality of heterogenous hardware elements according to the mapping.

19. The computer readable medium as recited in claim 18, wherein the side effects for particular ones of the nodes comprise interaction with a physical environment via input/output (I/O) through those nodes, and wherein the node information specifies consumption rates and production rates for multiple ones of the plurality of data flow nodes within a multi-rate dataflow program.

20. The computer readable medium as recited in claim 18, wherein the computer readable medium includes instructions that, when executed by the at least one processor, determine whether a data flow program is schedulable on a hardware platform based on the timing information, a scheduling policy, and worst-case execution times for the nodes, and includes further instructions, that when executed by the at least one processor responsive to determining that the dataflow program is not schedulable, perform at least one of the following:

inserting one or more downsample or upsample nodes on a failing path;
adjusting initial timing tokens;
adjusting period on one or more nodes;
adjusting one or more latency parameters; or
configuring one or more phase delay parameters.

21. The method of claim 1, the method further comprising:
by the computer system:
based on a determination that the plurality of dataflow nodes comprises an invalid program operation, reconfiguring the plurality of dataflow nodes and repeating said storing node information, storing timing constraints, and generating the TDG.

22. The method of claim 1, the method further comprising:
by the computer system:
deploying the plurality of dataflow nodes onto the different ones of the plurality of heterogeneous hardware elements in accordance with the mapping.

23. The system of claim 11,
wherein the plurality of instructions are executable by the at least one processor to further cause the system to:
based on a determination that the multi-rate dataflow program comprises an invalid program operation, reconfigure the multi-rate dataflow program and repeat said storing node information, storing timing constraints, and generating the TDG.

24. The system of claim 11,
wherein the plurality of instructions are executable by the at least one processor to further cause the system to:
deploy the plurality of dataflow nodes onto the different ones of the plurality of heterogeneous hardware elements in accordance with the mapping.

25. The non-transitory computer readable medium of claim 18,
wherein the instructions are executable by the processor to further cause the computer system to:
based on a determination that the multi-rate dataflow program comprises an invalid program operation, reconfigure the multi-rate dataflow program and repeat said storing node information, storing timing constraints, and generating the TDG.

26. The non-transitory computer readable medium of claim 18,
wherein the instructions are executable by the processor to further cause the computer system to:
deploy the plurality of dataflow nodes onto the different ones of the plurality of heterogeneous hardware elements in accordance with the mapping.

* * * * *